(12) United States Patent
Kikuchi

(10) Patent No.: US 7,650,075 B2
(45) Date of Patent: Jan. 19, 2010

(54) OPTICAL ADD-DROP MULTIPLEXER, AND OPTICAL NETWORK EQUIPMENT USING THE SAME

(75) Inventor: Nobuhiko Kikuchi, Tokyo (JP)

(73) Assignee: Hitachi Communication Technologies, Ltd., Tokyo (JP)

( * ) Notice: Subject to any disclaimer, the term of this patent is extended or adjusted under 35 U.S.C. 154(b) by 632 days.

(21) Appl. No.: 11/200,036

(22) Filed: Aug. 10, 2005

(65) Prior Publication Data

US 2006/0171717 A1 Aug. 3, 2006

(30) Foreign Application Priority Data

Feb. 1, 2005 (JP) .............................. 2005-024840

(51) Int. Cl.
*H04B 10/08* (2006.01)
*H04J 14/02* (2006.01)

(52) U.S. Cl. .............................. 398/83; 398/33; 398/82

(58) Field of Classification Search .................... 398/7, 398/17, 19, 33, 34, 82, 83
See application file for complete search history.

(56) References Cited

U.S. PATENT DOCUMENTS

| 5,612,805 | A | * | 3/1997 | Fevrier et al. | .................. 398/83 |
| 6,744,986 | B1 | * | 6/2004 | Vohra | ........................... 398/83 |
| 2006/0104641 | A1 | * | 5/2006 | Casanova et al. | ............. 398/83 |

FOREIGN PATENT DOCUMENTS

| EP | 1 043 859 B1 | 4/2000 |
| JP | 01-274525 | 4/1988 |
| JP | 06-244796 | 2/1993 |
| JP | 2000-354006 | 9/1999 |

OTHER PUBLICATIONS

"Configurable OADM Module", Santec, (Mar. 2003), pp. 1-2.

* cited by examiner

*Primary Examiner*—Dalzid Singh
(74) *Attorney, Agent, or Firm*—Stites & Harbison PLLC; Juan Carlos A. Marquez, Esq.

(57) ABSTRACT

Heretofore, it was necessary to individually locate an optical switch, an optical switch control circuit, and the like, before and after an optical transceiver that performs optical protection. As a result, costs and the space for implementation increase, and a delay in services is also caused, which were the problems.

For the purpose of solving the above problems, the present invention provides a simple optical protection method used in an optical add-drop multiplexer.

Add switches 105-1 through 105-N and drop switches 103-1 through 103-N for optical signals corresponding to each wavelength in an optical add-drop multiplexer 100 are made controllable independently of one another. Add switches and drop switches of the active-side and backup-side optical add-drop multiplexers are switched by optical switch control circuits 106-1 through 106-N respectively to make a detour around a failure so that the optical protection is achieved.

21 Claims, 20 Drawing Sheets

FIG.18

| SWITCH STATUS @ WAVELENGTH λ1 | | NORMAL CASE | IN CASE OF FAILURE 132 |
|---|---|---|---|
| FIG.2 : ACTIVE-OADM (130-2) IN NODE 124-2 | ADD SW | ADD STATE | ADD STATE |
| | DROP SW | DROP STATE | NON-DROP STATE |
| FIG.2 : BACKUP-OADM (131-2) IN NODE 124-2 | ADD SW | ADD STATE | ADD STATE |
| | DROP SW | NON-DROP STATE | DROP STATE |

FIG.19

| SWITCH STATUS @ WAVELENGTH λ1 | | NORMAL CASE | IN CASE OF FAILURE 132 |
|---|---|---|---|
| FIG.8 : ACTIVE-OADM (130-1) IN NODE 124-1 | ADD SW | ADD STATE | NON-ADD STATE |
| | DROP SW | DROP STATE | DROP/NON-DROP STATE (DON'T CARE) |
| FIG.8 : BACKUP-OADM (131-1) IN NODE 124-1 | ADD SW | NON-ADD STATE | ADD STATE |
| | DROP SW | DROP/NON-DROP STATE (DON'T CARE) | DROP STATE |

FIG.20

| SWITCH STATUS @ WAVELENGTH λ1 | | NORMAL CASE | IN CASE OF FAILURE 132 |
|---|---|---|---|
| ACTIVE-SIDE OADM (130-2) IN CASE THE FAILURE POINT IS LOCATED ADJACENT DOWNSTREAM | ADD SW | NON-ADD STATE | NON-ADD STATE |
| | DROP SW | NON-DROP STATE | DROP STATE |
| ACTIVE-SIDE OADM (130-3) IN CASE THE FAILURE POINT IS LOCATED ADJACENT UPSTREAM | ADD SW | NON-ADD STATE | ADD STATE |
| | DROP SW | NON-DROP STATE | NON-DROP STATE |
| BACKUP-SIDE OADM (131-2) IN CASE THE FAILURE POINT IS LOCATED ADJACENT DOWNSTREAM | ADD SW | NON-ADD STATE | ADD STATE |
| | DROP SW | NON-DROP STATE | NON-DROP STATE |
| BACKUP-SIDE OADM (131-3) IN CASE THE FAILURE POINT IS LOCATED ADJACENT UPSTREAM | ADD SW | NON-ADD STATE | NON-ADD STATE |
| | DROP SW | NON-DROP STATE | DROP STATE |

US 7,650,075 B2

OPTICAL ADD-DROP MULTIPLEXER, AND OPTICAL NETWORK EQUIPMENT USING THE SAME

CLAIM OF PRIORITY

The present application claims priority from Japanese application JP2005-024840, filed on Feb. 1, 2005, the content of which is hereby incorporated by reference into this application.

BACKGROUND OF THE INVENTION

1. Field of the Invention

The present invention relates to an optical add-drop multiplexer, and optical network equipment using the same, and more particularly to transmission of optical information by use of optical fibers.

2. Description of Related Art

The wavelength division multiplexed (WDM) optical transmission method is a very effective method for increasing the capacity of optical fiber communications. In this method, a plurality of optical signals whose wavelengths differ from one another are multiplexed into one optical fiber to transmit information. An optical add-drop multiplexer (OADM) is a kind of transmission equipment placed at each node in an optical fiber network that carries a wavelength division multiplexed signal. The optical wavelength add-drop multiplexer uses a technology by which from a WDM signal that is transmitted through an optical fiber, only an optical signal having a necessary wavelength is branched (dropped) to receive the optical signal, and an optical signal to be transmitted from this node is inserted (added) into the WDM signal. In the optical wavelength add-drop multiplexer, most WDM signals transmitted through an optical fiber can be passed through as light without converting the WDM signals into electric signals. The optical wavelength add-drop multiplexer, therefore, has an advantage of being able to reduce, to a large extent, the number of optical transceivers required for each node. Above all, the reconfigurable optical wavelength add-drop multiplexer (ROADM) uses an optical switch, or the like, and thereby can change, if necessary, a wavelength that is added/dropped at each node. The reconfigurable optical wavelength add-drop multiplexer attracts a great deal of attention because the configuration of transmission equipment is flexibly changed in response to the future growth of a network to provide wavelength paths. Its typical configuration is described in the catalogue titled "Configurable OADM Module" by Suntech, Mar. 2003, page 1. It is to be noted that hereinafter this equipment is referred to as "optical add-drop multiplexer" for the sake of simplicity.

FIG. 5 is a diagram illustrating the configuration of a typical conventional optical add-drop multiplexer 140. A wavelength division multiplexed signal, which is transmitted from other wavelength division multiplexed optical transmission equipment such as an optical add-drop multiplexer, is inputted into an optical add-drop multiplexer 140 through an input WDM optical fiber line 101. This is an example in which optical signals corresponding to eight wavelengths are wavelength division multiplexed. An optical wavelength demultiplexer 102 demultiplexes the wavelength division multiplexed signal into different through signal paths 104-1 through 104-8 that correspond to wavelengths $\lambda 1$ through $\lambda 8$ respectively. After that, the demultiplexed signals are wavelength division multiplexed by an optical wavelength multiplexer 110 again, and this wavelength division multiplexed signal is then transmitted from an output WDM optical fiber line 111 to other optical transmission equipment. Usually, an AWG (arrayed waveguide grating) device, a device in which a tandem connection between dielectric multi-layer film and an optical fiber grating is made, and the like, are used as the optical wavelength demultiplexer 102 and the optical wavelength multiplexer 110.

2×2 optical switches 141-1 through 141-8 used for switching to an add-drop state of an optical signal are located in the middle of the through signal paths 104-1 through 104-8 respectively. Each of the 2×2 optical switches can make switching between two states, a through state and the add-drop state. The through state is a state in which, as shown in the example of the 2×2 optical switch 141-1, an optical signal corresponding to each wavelength (for example, $\lambda 1$), which is inputted from the input WDM optical fiber line 101 into each through signal path through the optical wavelength demultiplexer 102, is output to the output WDM optical fiber line 111 through the optical wavelength multiplexer 110 as it is. The add-drop state is a state in which, as shown in the example of the 2×2 optical switch 141-2, an optical signal corresponding to each wavelength (for example, $\lambda 2$), which is inputted from the input WDM optical fiber line 101 into each through signal path through the optical wavelength demultiplexer 102, is dropped into the drop signal output optical fiber 108-2, and at the same time an optical signal corresponding to the wavelength $\lambda 2$ inputted from the add signal input optical fiber 109-2 is connected to the through signal path 104-2, and is then output to the output WDM optical fiber line 111 through the optical wavelength multiplexer 110. To be more specific, if the optical switch 141-N is in the through state, an optical signal corresponding to the wavelength $\lambda N$ inputted from the input WDM optical fiber line 101 is passed through the optical add-drop multiplexer ("through"). On the other hand, if the optical switch 141-N is in the add-drop state, the optical signal corresponding to the wavelength $\lambda N$ is branched and extracted by the optical add-drop multiplexer ("drop"), and at the same time a new optical signal is added ("add"), and is then output to the output WDM optical fiber line 111.

Incidentally, one of the important functions of a wavelength division multiplexed optical network using OADM, and the like, is an optical protection function. This technique is disclosed in, for example, Japanese Patent Laid-Open No. Hei 6-244796. FIG. 6 is a diagram illustrating the configuration example of the conventional optical protection. This example relates to an optical 1+1 method in which a path of an optical signal having the wavelength $\lambda 1$ is duplexed with active and backup signal lines, the path being provided between the node 124-1 and the node 124-2 in the ring network. In the event that a failure occurs in the active signal line, switching to the backup side is made on the receiving side. The optical network has a configuration in which three nodes 124-1 through 124-3 are connected to one another by use of two optical fiber lines, a clockwise active WDM optical fiber line 120 and a counterclockwise backup WDM optical fiber line 121. The conventional active-side optical add-drop multiplexers 143-1 through 143-3 and the conventional backup-side optical add-drop multiplexers 144-1 through 144-3 are located in the nodes 124-1 through 124-3 respectively. Here, the conventional active-side optical add-drop multiplexers 143-1 through 143-3 are connected to the active WDM signal line 120; and the conventional backup-side optical add-drop multiplexers 144-1 through 144-3 are connected to the backup wavelength path 121. The optical add-drop multiplexers in the nodes 124-1, 124-2 communicate with each other by adding or dropping a signal having the wavelength $\lambda 1$.

If the optical protection is not used, an optical signal is transmitted by use of only the active WDM optical fiber line 120 without using the backup signal line 121, a 1:2 optical coupler 128, and a 2×1 optical switch 142 shown in the figure. To be more specific, the optical transmitter 125-1 is connected to the add signal input optical fiber 109-1-1 of the active-side optical add-drop multiplexer 143-1, whereas the optical receiver 126-2 is connected to the drop signal output optical fiber 108-2-1 of the active-side optical add-drop multiplexer 143-2. An optical signal is passed through the path 122-1 of an active optical signal having the wavelength λ1, and is transmitted clockwise from the node 124-1 to the node 124-2 before the optical signal is received there. At the same time, the optical transmitter 125-2 is connected to the add signal input optical fiber 109-2-1 of the active-side optical add-drop multiplexer 143-2, whereas the optical receiver 126-1 is connected to the drop signal output optical fiber 108-2-1. An optical signal is passed through the path 122-2 of an active optical signal having the wavelength λ1, and is transmitted clockwise from the node 124-2 to the node 124-1 through the node 143-3 in a through state, before the optical signal is received at the node 124-1. However, in the above conditions, if a failure 132 such as fiber cut occurs in the optical signal path, it becomes impossible to use the path 122-1 of the active optical signal. As a result, communications from the node 124-1 to the node 124-2 are disabled.

The optical protection is a function of quickly recovering a signal line when such a failure occurs. In this conventional example, the backup WDM signal line 121 through which an optical signal passes in a reverse direction is prepared. In the transmission-side node (for example, 124-1), an optical signal which is output from the optical transmitter 125-1 is branched into two by the 1:2 optical coupler 127-1. The branched optical signals are inputted into both the active-side add signal input optical fiber 109-1-1 and the add signal input optical fiber 109-1-2 of the backup-side optical add-drop multiplexer 144-1 respectively. In the backup-side WDM optical fiber line 121, this optical signal is transmitted counterclockwise along the path 123-1 of a backup optical signal having the wavelength λ1, and is passed through the node 124-3, and then arrives at the node 124-2 where the optical signal is output from the drop signal output optical fiber 108-2-2 of the backup-side optical add-drop multiplexer 144-2. A 2×1 optical switch 142-2 is located immediately before the optical receiver 126-2. The 2×1 optical switch 142-2 selects either an optical signal of the active-side drop signal output optical fiber 108-2-1 or that of the backup-side drop signal output optical fiber 108-2-2, and then inputs the selected optical signal into the optical receiver 109-2-1. The 2×1 optical switch 142-2 usually selects the active-side optical signal. However, if a failure 132 occurs and thereby the active-side optical signal 122-1 is interrupted, the optical switch control circuit 145-2 usually quickly switches the 2×1 optical switch 142-2 to the backup signal line side within several tens of milliseconds in response to a failure signal 107-2, and then inputs into the optical receiver 126-2 the optical signal passing through the path 123-1 of the backup optical signal so that the optical signal is not interrupted. Also for the signal line through which an optical signal passes from the node 124-2 to the node 124-1, the optical protection function is implemented completely in the same manner.

SUMMARY OF THE INVENTION

The achievement of the above-mentioned optical protection functions requires the additional parts or boards, including the 2×1 optical switches 142-1, 142-2, and the optical switch control circuits 145-1, 145-2. Therefore, the costs of equipment increase, and extra space for accommodating the boards is required, which are the main problems. Moreover, if each signal line corresponding to each wavelength requires these functions, it is necessary to deliver the parts or boards required for the nodes 124-1, 124-2 that are several tens of kilometers away, and also to implement the parts or boards by an operator there, with the result that it takes extra time until services are provided.

Furthermore, if an external optical switch is used, it is possible to achieve only the optical protection having a simple configuration such as the 1+1 optical protection and the 1:1 optical protection. However, such optical protection cannot be applied to another information traffic of a backup signal line, and cannot cope with a multiple failure, or the like. Therefore, there are also the problems of low economical efficiency and low reliability.

Among the above problems, the problem of requiring the external additional parts or boards, the problem of requiring the additional space for accommodation, and other problems relating to them, can be solved by: equipping the optical add-drop multiplexer with an add switch capable of switching an optical signal from an add state to a non-add state and vice versa and independently from this add switch, with a drop switch capable of switching an optical signal from a drop state to a non-drop state and vice versa; and using the add switch or the drop switch as an optical protection switch to make switching in the event of a failure.

For example, the 1+1 optical protection can be achieved as follows. In an optical add-drop multiplexer on the active signal line side, which is located on the farthest downstream side of an optical signal path, the drop switch is usually set to a drop state, whereas if a failure occurs, the drop switch is switched to a non-drop state. In addition, in an optical add-drop multiplexer on the backup signal line side, which is located on the farthest downstream side of an optical signal path, the drop switch is usually set to a non-drop state, whereas if a failure occurs, the drop switch is switched to a drop state.

Next, the 1:1 optical protection can be achieved as follows. In an optical add-drop multiplexer on the active signal line side, which is located on the farthest upstream side of an optical signal path, the add switch is usually set to an add state, whereas if a failure occurs, the add switch is switched to a non-add state. In addition, in an optical add-drop multiplexer on the backup signal line side, which is located on the farthest upstream side of an optical signal path, the add switch is usually set to a non-add state, whereas if a failure occurs, the add switch is switched to an add state.

If the above 1+1 optical protection function and the above 1:1 optical protection function are used in combination, it becomes possible to achieve both of the optical protection functions in one kind of optical add-drop multiplexer.

In addition, an optical protection method with high functionality, such as more complicated optical span switch and a more complicated optical ring switch, can be realized as follows. In the active-side optical add-drop multiplexer, if a failure occurs on the adjacent upstream side, the add switch is switched to an add state, whereas if a failure occurs on the adjacent downstream side, the drop switch is switched to a drop state. On the other hand, in the backup-side optical add-drop multiplexer, if a failure occurs on the adjacent upstream side of the active signal line, the drop switch is switched to a drop state, whereas if a failure occurs on the adjacent downstream side of the active signal line, the add switch is switched to an add state.

It is to be noted that by locating a switch for blocking a through signal in an optical signal path corresponding to each wavelength, it is possible to use a plurality of different optical protection methods such as the 1:1 optical protection and the 1+1 optical protection in combination in the present invention.

The node in which the optical transmitter and the optical receiver according to the present invention are located can be realized as follows. If an optical signal inputted from an external light source such as an optical transmitter is added to a WDM signal line, the inputted optical signal is branched into two through a 1:2 optical coupler, and then the branched optical signals are connected to an add signal input optical fiber of the active-side optical add-drop multiplexer and an add signal input optical fiber of the backup-side optical add-drop multiplexer respectively. On the other hand, if an optical signal is received from a WDM signal line by dropping this optical signal, a 2:1 optical coupler is used to connect a drop signal output optical fiber of the active-side optical add-drop multiplexer and a drop signal output optical fiber of the backup-side optical add-drop multiplexer to two input fibers of the optical coupler respectively so that any one of output light of both drop signal output optical fibers is output from an output fiber of the optical coupler, and the output light in question is then received.

In particular, the optical transceiver located in the above transmit/receive node can be realized as a smaller device with high modularity by configuring the optical transceiver as a two-output optical transmitters including a built-in 1:2 optical coupler, or as a two-input optical receiver including a 2:1 built-in coupler, or as a two-output two-input optical transceiver into which both of them are combined.

In addition, a node, which serves as network equipment for achieving the span switch function, can be configured by: connecting a drop signal output optical fiber of the active-side forward direction optical add-drop multiplexer to an add signal input optical fiber of the backup-side forward direction optical add-drop multiplexer; connecting a drop signal output optical fiber of the backup-side forward direction optical add-drop multiplexer to an add signal input optical fiber of the active-side forward direction optical add-drop multiplexer; connecting a drop signal output optical fiber of the active-side backward direction optical add-drop multiplexer to an add signal input optical fiber of the backup-side backward direction optical add-drop multiplexer: and connecting a drop signal output optical fiber of the backup-side backward direction optical add-drop multiplexer to an add signal input optical fiber of the active-side backward direction optical add-drop multiplexer.

On the other hand, a node, which serves as a network equipment for achieving the ring switch function, can be configured by: connecting a drop signal output optical fiber of the active-side forward direction optical add-drop multiplexer to an add signal input optical fiber of the backup-side backward direction optical add-drop multiplexer; connecting a drop signal output optical fiber of the backup-side forward direction optical add-drop multiplexer to an add signal input optical fiber of the active-side backward direction optical add-drop multiplexer: connecting to a drop signal output optical fiber of the active-side backward direction optical add-drop multiplexer to an add signal input optical fiber of the backup-side forward direction optical add-drop multiplexer; and connecting a drop signal output optical fiber of the backup-side backward direction optical add-drop multiplexer to an add signal input optical fiber of the active-side forward direction optical add-drop multiplexer.

In particular, a matrix switch capable of mutually interchanging optical signals of a plurality of add signal fibers and those of a plurality of drop signal fibers, or optical couplers which branch an add signal fiber into a plurality of optical fibers and branch a drop signal fiber into a plurality of optical fibers, are located in each optical add-drop multiplexer. Then, by making a connection for either the span switch or the ring switch, or by making connections for both of them, it is possible to achieve the span switch and the ring switch at the same time, and further to achieve the optical protection in a generally used mesh optical network.

Moreover, for an optical signal that is transmitted across a plurality of optical networks, optical protection on a network basis can be achieved as follows. At a junction point of the two networks, drop signal output optical fibers of the active-side and backup-side optical add-drop multiplexers in the first optical network are connected to two input fibers of a first 2:2 optical coupler respectively; and two output fibers of the first 2:2 optical coupler are connected to add signal input optical fibers of the active-side and backup-side optical add-drop multiplexers in the second optical network respectively. On the other hand, drop signal output optical fibers of the active-side and backup-side optical add-drop multiplexers in the second optical network are connected to two input fibers of a second 2:2 optical coupler respectively; and two output fibers of the second 2:2 optical coupler are connected to add signal input optical fibers of the active-side and backup-side optical add-drop multiplexer in the first optical network respectively.

The whole 1+1 optical network according to the present invention can be achieved as follows. In optical network equipment in which active-side and backup-side optical add-drop multiplexers according to claim 2 are located, optical network equipment according to claim 8 is located at input and output points of an optical signal from and to WDM signal lines, and an optical signal is transmitted from an input point on the farthest upstream side to an output point on the farthest downstream side by use of both an active signal line and a backup signal line. Usually, only an optical signal transmitted through the active-side path is dropped and received by drop switches of the active-side and backup-side optical add-drop multiplexers located on the farthest downstream side. If a failure occurs, the drop switches of the active-side and backup-side optical add-drop multiplexers located on the farthest downstream side are switched to drop and receive only an optical signal transmitted through the backup-side path.

Moreover, the whole 1:1 optical network according to the present invention can be achieved as follows. In optical network equipment in which active-side and backup-side optical add-drop multiplexers according to claim 3 or 4 are located, optical network equipment according to claim 8 is located at input and output points of an optical signal from and to WDM signal lines. Usually, the optical signal is transmitted from an input point on the farthest upstream side to an output point on farthest downstream side by use of only the active-side optical path. If a failure occurs, add switches of the active-side and backup-side optical add-drop multiplexers located on the farthest upstream side are switched to transmit the optical signal to the backup-side path.

Further, the whole span-switch optical network, and the whole ring-switch optical network, according to the present invention can be achieved as follows. In optical network equipment in which active-side and backup-side optical add-drop multiplexers according to claim 5 or 6 are located, optical network equipment according to claim 8 is located at input and output points of an optical signal from and to WDM signal lines. Usually, an optical signal is transmitted from an input point on the farthest upstream side to an output point on the farthest downstream side by use of only the active-side optical path. If a failure occurs, a state of an add switch or that of a drop switch is switched in the active-side and backup-side optical add-drop multiplexers both on the adjacent upstream side and on the adjacent downstream side of a point of failure to make a detour around a faulty span of the active signal line so that the optical signal is transmitted to the backup-side path.

In addition, the 1+1 optical protection for an optical signal which is transmitted across a plurality of optical networks can be achieved as follows. Input and output points of each optical network are mutually connected by use of optical network equipment according to claim 15; and optical network equipment according to claim 8 is located at input and output points of the optical signal. In each optical network, both of the active-side and backup-side optical paths are used to transmit the optical signal corresponding to the wavelength from an input point of each optical network to an output point of each optical network. If a failure occurs in a certain optical network, drop switches of the active-side and backup-side optical add-drop multiplexers of optical network equipment according to claim 15, which is located at an output point of the optical network, are switched to select an optical signal transmitted through the backup-side path so that the selected optical signal is output to the second network or the optical network equipment according to claim 8.

Moreover, the optical protection such as the 1:1 optical protection or the ring-switch optical protection can be achieved as follows. Using only the active-side optical path in each optical network, an optical signal is transmitted from an input point of each optical network to an output point of each optical network. If a failure occurs in a certain optical network, add switches of the second active-side and backup-side optical add-drop multiplexers of the optical network equipment according to claim 15, which is located at an input point of each optical network, are switched to transmit the optical signal using the backup-side path.

According to the present invention, it is possible to achieve the optical protection functions without using external active parts. In addition, it is possible to achieve the optical protection with high functionality, with high cost effect, with increased failure resistivity, and with high reliability. Moreover, very high-speed optical protection becomes possible.

BRIEF DESCRIPTION OF THE DRAWINGS

FIG. 18 is a table illustrating states in which optical switches are switched according to the first embodiment of the present invention;

FIG. 19 is a table illustrating states in which optical switches are switched according to the third embodiment of the present invention; and FIG. 20 is a table illustrating states in which optical switches are switched according to the fourth and fifth embodiments of the present invention.

DETAILED DESCRIPTION OF THE PREFERRED EMBODIMENTS

Figure 4:
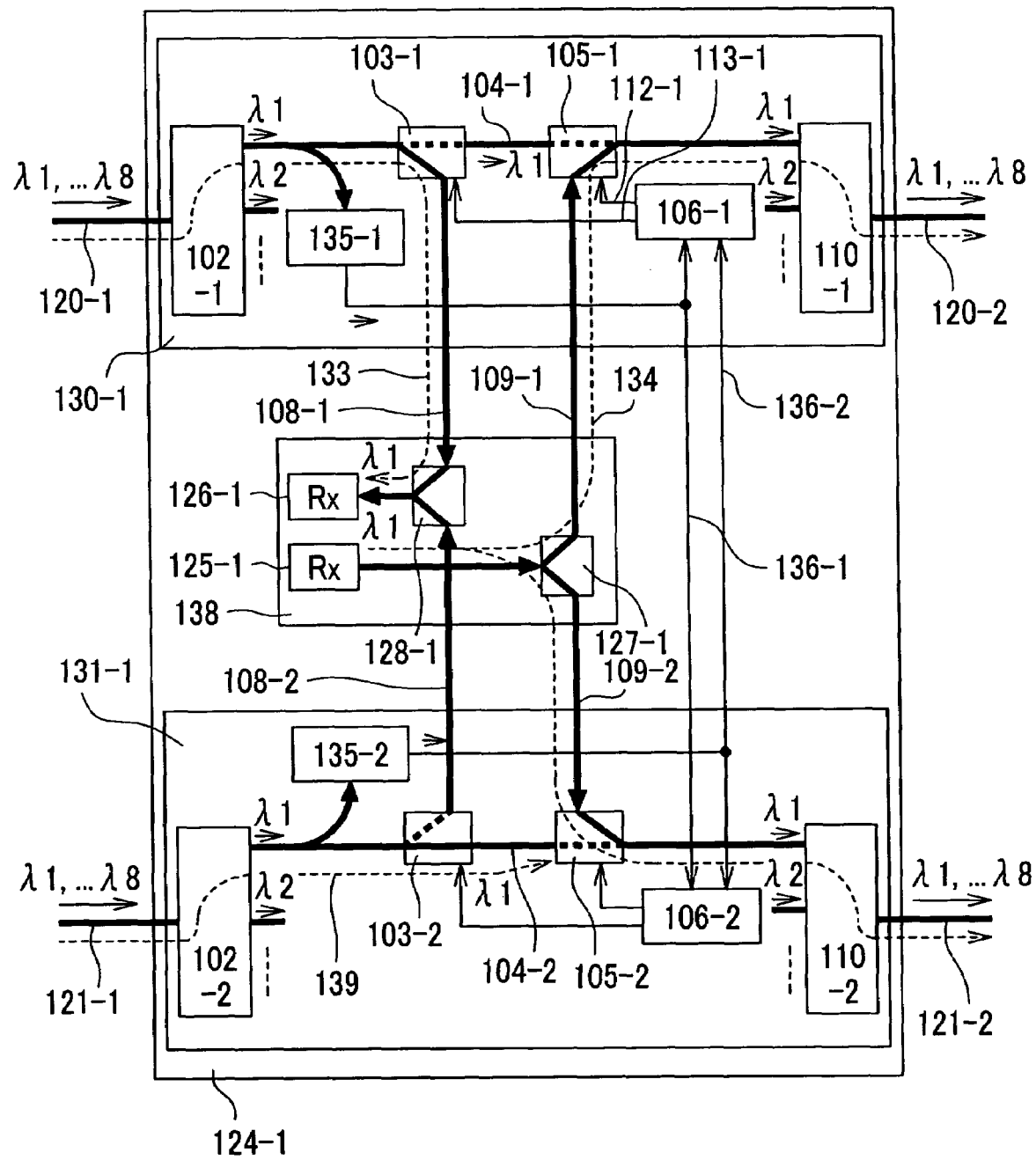
FIG. 4 is a schematic view illustrating a second embodiment of the present invention.
Figure 5:
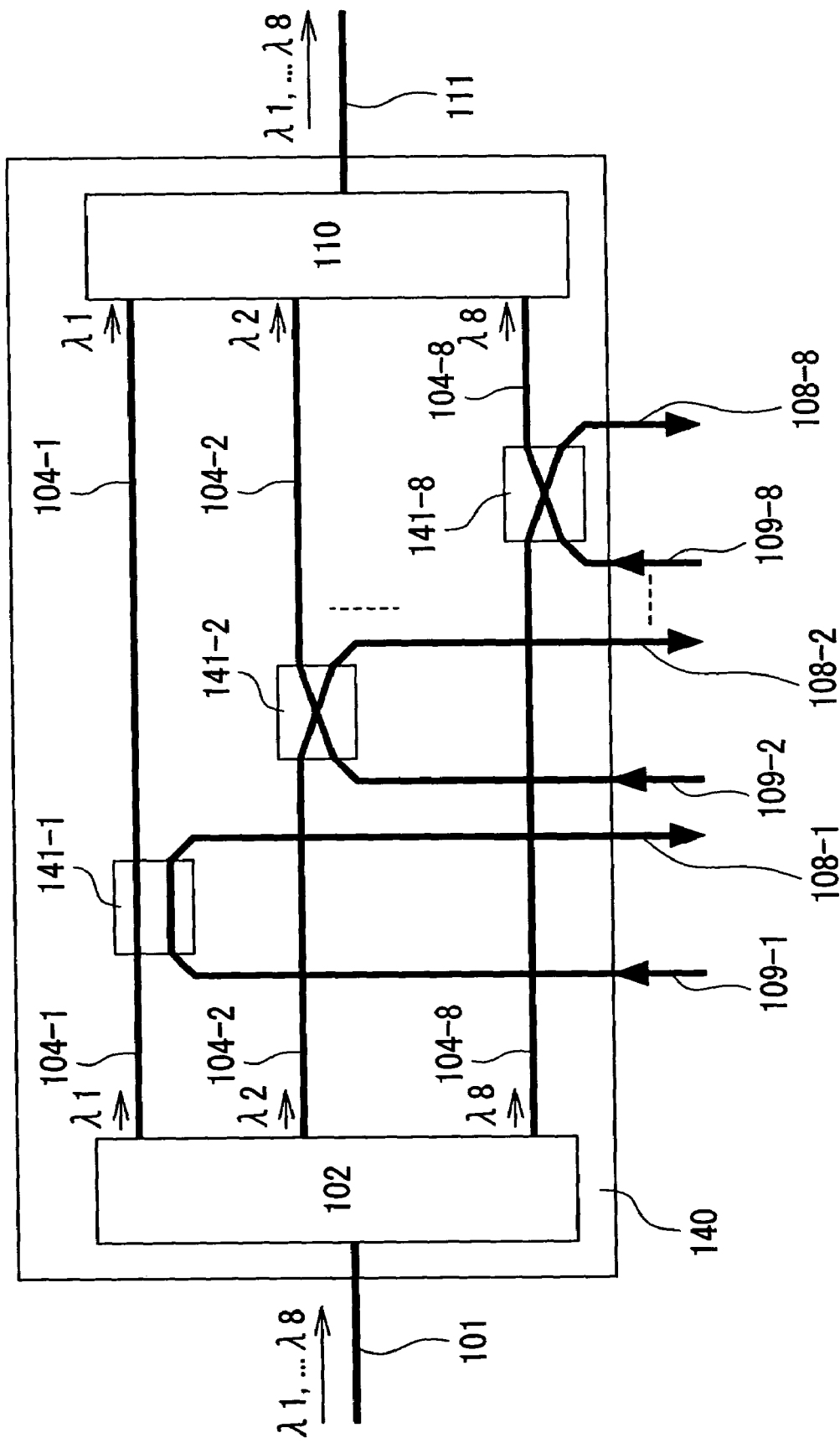
FIG. 5 is a diagram illustrating the configuration of a conventional optical add-drop multiplexer.

The best mode for carrying out the present invention will be described as below. An existing optical add-drop multiplexer 100 shown in FIG. 1 includes 1×2 optical switches 103-1 through 103-8 for switching a drop signal from a drop state to a non-drop state and vice versa and 2×1 optical switches 105-1 through 105-8 for switching an add signal from an add state to a non-add state and vice versa, so that an add state and a drop state can be independently set. The optical add-drop multiplexer 100 also provides an optical protection function by causing optical switch control circuits 106-1 through 106-8 to switch add-drop switches in response to a failure signal 107 of an optical signal. As shown in FIG. 4, the optical add-drop multiplexer is further connected to both active and backup WDM optical fiber lines 120, 121 to provide a node 124 for switching between an optical switch on the active side and that on the backup side in response to where a failure has occurred and in response to a required optical protection method. By using the thus-formed node 124, an optical network shown in FIG. 2 is constructed.

First Embodiment

Figure 1:
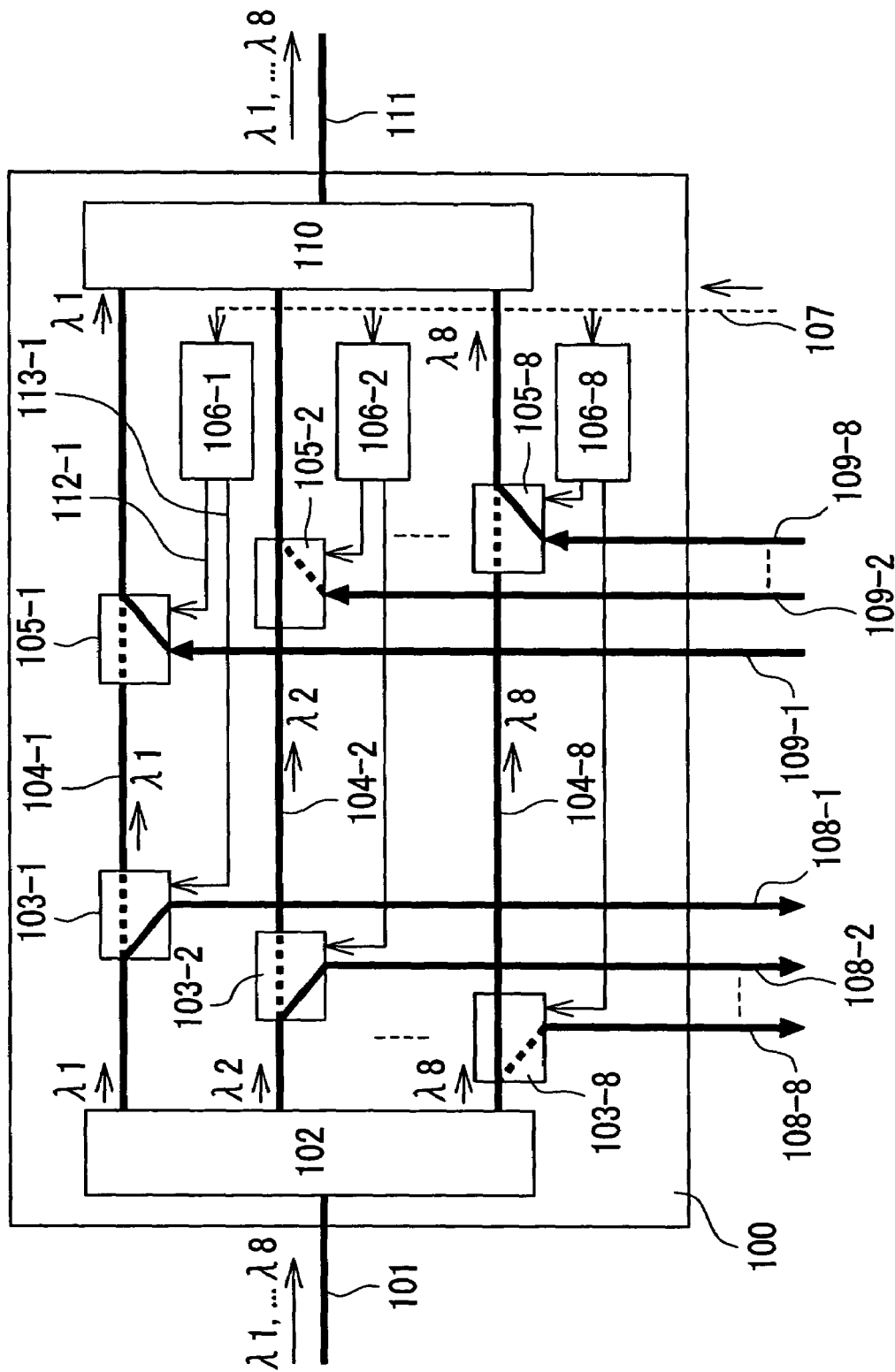
FIG. 1 is a schematic view illustrating a first embodiment of the present invention.
Figure 2:
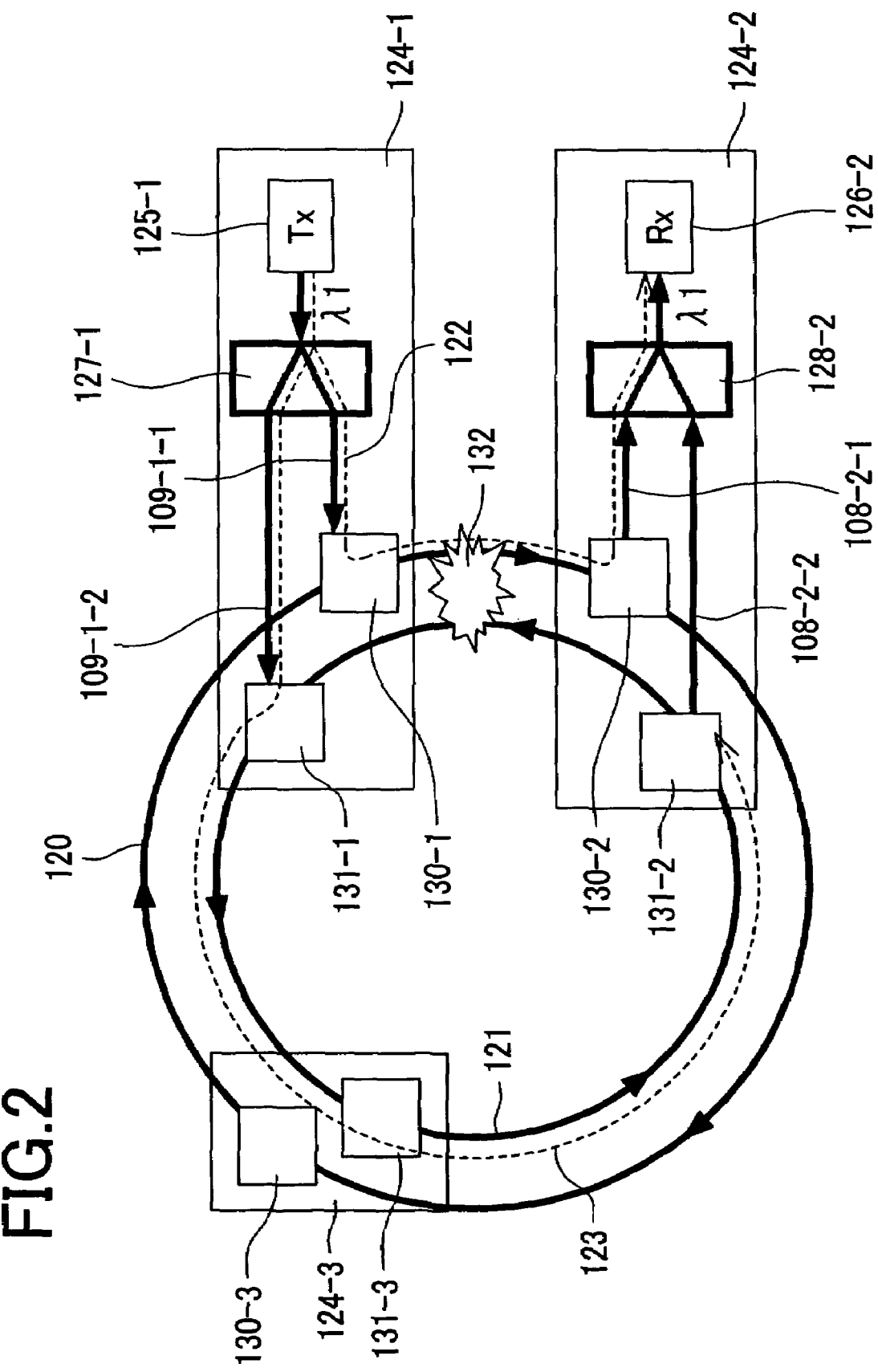
FIG. 2 is a diagram illustrating a network configuration in which 1+1 optical protection according to the first embodiment of the present invention is used.

FIG. 1 is a schematic view illustrating a first embodiment according to the present invention. FIG. 1 illustrates an example of how an optical add-drop multiplexer (OADM) 100 according to the present invention is configured. The optical add-drop multiplexer 100 according to the present invention is located between an input WDM optical fiber line 101 and an output WDM optical fiber line 111. An inputted wavelength-division multiplexed signal having eight wavelengths λ1 through λ8 is separated and passed into through signal paths 104-1 through 104-8 on a wavelength basis by an optical wavelength demultiplexer 102. After that, the separated signals are wavelength-division multiplexed by an optical wavelength multiplexer 110 again, and this wavelength-division multiplexed signal is then output.

1×2 optical switches (drop switches) 103-1 through 103-8 used to set a drop state of an optical signal, and 2×1 optical switches (add switches) 105-1 through 105-8 used to set an add state of an optical signal, are located in the middle of each of the through signal paths 104-1 through 104-8 respectively. A drop switch 103-N located in the through signal path 104-N is an optical switch with one input and two outputs. The drop switch 103-N can set either of two states: a drop state, more specifically, extracting an optical signal having a wavelength of λN from the wavelength division multiplexed signal inputted from the input WDM optical fiber line 101 (for example, 103-1) to output the extracted optical signal to the drop signal output optical fiber 108-N; or a non-drop state, more specifically, passing through the inputted wavelength division multiplexed signal just as it is (for example, 103-8). On the other hand, the add switch 105-N is an optical switch with two inputs and one output. The add switch 105-N can set either of two states: an add state, more specifically, outputting an optical signal, which is inputted from the add signal input optical fiber 109-N, to the output WDM signal line 111 (for example, 105-1); or a non-add state, more specifically, passing through, just as it is, an optical signal output from the drop switch 103-N (for example, 105-2). Each of the optical switch control circuits 106-1 through 106-8 switches between the states of the drop switches 103-1 through 103-8 and those of the add switches 105-1 through 105-8 in response to failure information 107 so that the optical protection described later is achieved.

When the optical protection is not used, the optical add-drop multiplexer according to the present invention operates in a manner similar to that of the conventional optical add-drop multiplexer. To be more specific, if an optical signal having a certain wavelength λN is added and dropped, the drop switch 103-N and the add switch 105-N each corresponding to the optical signal are set to a drop state and an add state at the same time respectively. On the other hand, if the optical signal having the wavelength λN is passed through, both of the drop switch 103-N and the add switch 105-N are set to a non-drop state and a non-add state at the same time respectively.

FIG. 2 is a diagram illustrating a network configuration in which 2-fiber 1+1 protection is used in the first embodiment of the present invention. Here, FIG. 2 illustrates only a path through which an optical signal is transmitted from a node 124-1 to a node 124-2 for the sake of simplification. Configurations of active and backup optical add-drop multiplexers 130, 131 are the same as those shown in FIG. 1. As is the case with the conventional optical protection, an optical signal, which is output from the optical transmitter 125-1; is branched into two by a 1:2 optical coupler 127-1. After that, the optical signals are inputted into an add signal input optical fiber 109-1-1 of the active side optical add-drop multiplexer 130-1 according to the present invention and an add signal input optical fiber 109-1-2 of the backup side optical add-drop multiplexer 131-1 according to the present invention. Then, through a clockwise active path 122 and a counterclockwise backup path 123 each corresponding to a wavelength λ1, the optical signals are transmitted to the active side optical add-drop multiplexer 130-2 and the backup side optical add-drop multiplexer 131-2 according to the present invention, both of which are located in a node 124-2 on the receiving side. In the receiving node 124-2, the optical receiver 126-2 is configured to be connected to both a drop signal output optical fiber 108-2-1 of the active-side optical add-drop multiplexer 130-2 and a drop signal output optical fiber 108-2-2 of the backup-side optical add-drop multiplexer 131-2 by use of a 2:1 optical coupler 128-2 so that optical signals of both of the fibers are inputted into the optical receiver 126-2.

In order to achieve the 1+1 optical protection, the add switch (105-1 in FIG. 1) inside the optical add-drop multiplexers 130-1, 131-1 on the transmission side is always kept in an add state so that both signals are transmitted to the active and backup WDM signal lines 120, 121 at the same time. In addition, on the receiving side, if the signal lines are normal, a drop switch (103-1 in FIG. 1) in the active-side optical add-drop multiplexer 130-2 is set to a drop state, whereas a drop switch (103-1 in FIG. 1) in the backup-side optical add-drop multiplexer 131-2 is set to a non-drop state. As a result, an optical signal having the wavelength λ1, which is passed through the path 122 of the active optical signal, is output only from the drop signal output optical fiber 108-2-1. The output optical signal is passed through the 2:1 optical coupler 128-2, and is then inputted into the optical receiver 126-2.

If a line failure 132 occurs, inside the node 124-2 on the receiving side, a drop switch (103-1 in FIG. 1) in the active-side optical add-drop multiplexer 130-2 is set to a non-drop state, whereas a drop switch (103-1 in FIG. 1) in the backup-side optical add-drop multiplexer 131-2 is set to a drop state. As a result, an optical signal is not output from the drop signal output optical fiber 108-2-1. An optical signal having the wavelength λ1, which is passed through the path 123 of the backup optical signal, is newly output from the drop signal output optical fiber 108-2-2. The output optical signal is then inputted into the optical receiver 126-2, with the result that the optical protection function can be achieved.

Figure 7:
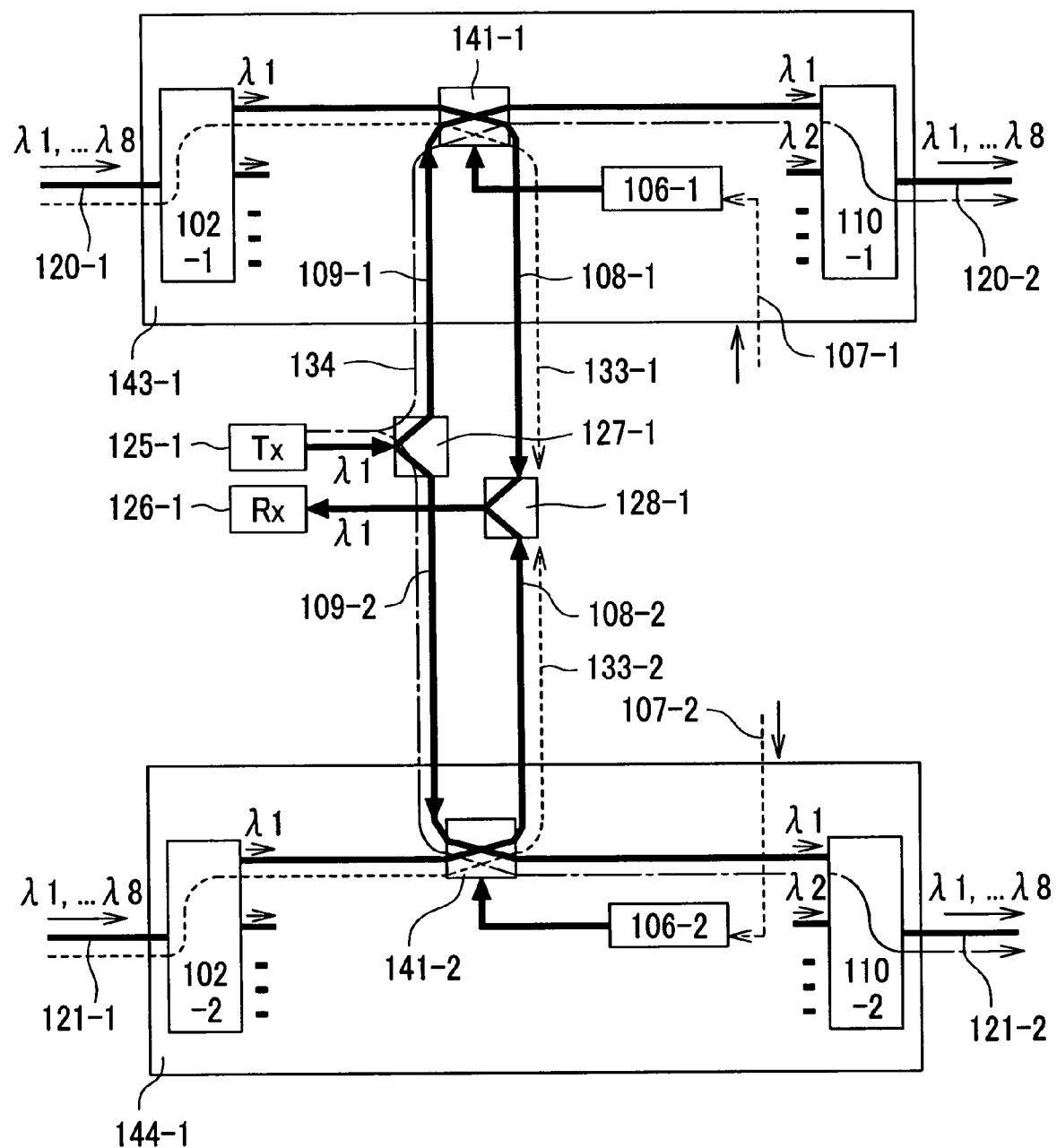
FIG. 7 is a schematic view illustrating problems of optical protection using the conventional optical add-drop multiplexer.

Incidentally, in the optical protection configuration according to the present invention, being able to independently control the add switch and the drop switch is an indispensable requirement. It is because in the 1+1 optical protection in an optical ring network, it is not necessary to switch only a state of the drop switch with a state of the add switch on the transmission side being kept unchanged. FIG. 7 shows problems produced when the optical protection according to the present invention is configured by use of the conventional optical add-drop multiplexers 143, 144 each using a 2×2 optical switch. In this example, an optical transmitter 125-1 and an optical receiver 126-1 are connected to an optical receiver and an optical transmitter in another node through a path 133 of a transmitted light and a path 134 of received light respectively. In this example, in order to achieve the 1+1 optical protection, both the active-side and backup-side 2×2 optical switches 141-1, 141-2 are set to an add-drop state so that an output light of the optical transmitter 125-1 is output to the active-side and backup-side WDM signal lines 120-2, 121-2 at the same time. At this time, both of the 2×2 optical switches are also always kept in a drop state. For this reason, as shown in the path 133-1 and the path 133-2, both of the optical signals each having the wavelength λ1, which are inputted from the active-side WDM optical fiber line 120-1 and the backup-side WDM optical fiber line 121-1, are passed through the 2×2 optical switch 141-1, 141-2, and are then inputted into the 2:1 optical coupler 128-1 at the same time. Consequently, both of the optical signals collide with each other, resulting in a state in which the optical signals cannot be received. Therefore, it is found out that the optical add-drop multiplexers using the 2×2 optical switch cannot be applied to the optical protection according to the present invention.

Incidentally, if at the time of normal operation the active-side 2×2 optical switch 141-1 is set to an add-drop state whereas the backup-side 2×2 optical switch 141-2 is set to a through state, the optical signal is transmitted only to the active-side WDM signal line. Therefore, it is possible to avoid the above collision state for the present. While keeping this state, in the event of a failure, if the active-side 2×2 optical switch 141-1 is switched to a through state whereas the backup-side 2×2 optical switch 141-2 is switched to an add-drop state, the whole optical path is changed to a backup line.

Figure 6:
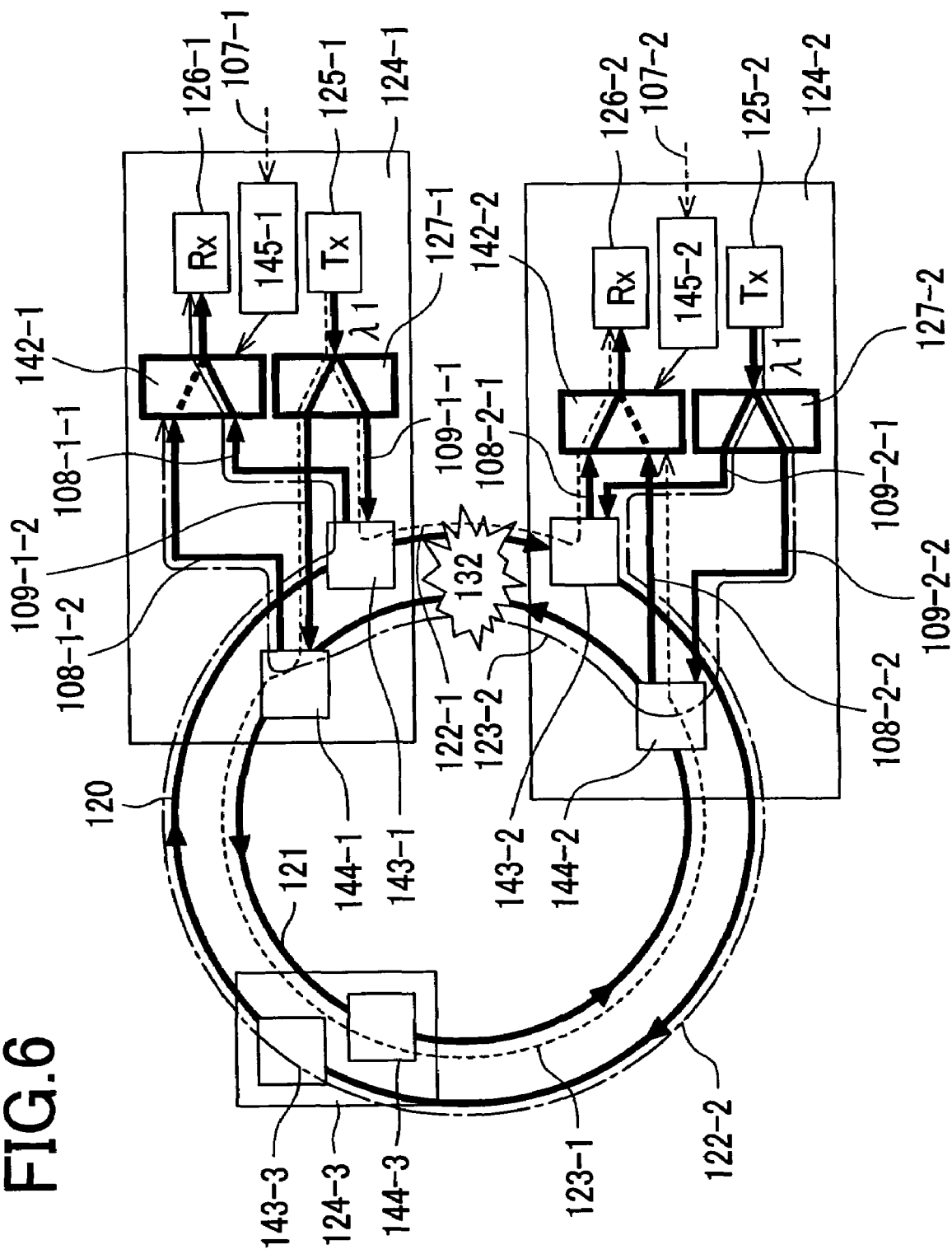
FIG. 6 is a diagram-illustrating the configuration of conventional 1+1 optical protection.

Apparently, it seems that the 1:1 optical protection for switching the optical path on the transmission side can be achieved. However, in this example, not only an optical signal line on an outgoing path for transmitting an optical signal from the optical transmitter 125-1 of this node to a node at the other end, but also an optical signal on a return path received by the optical receiver 126-1 is switched from the active signal line to the backup signal line at the same time, which becomes a problem. To be more specific, for example, as shown in FIG. 6, if a failure 132 such as an optical fiber break has occurred at a certain point, there is a possibility that a failure will occur at the same time not only in the active-side optical path 122-1 corresponding to the outgoing path from the node 124-1 to the node 124-2 but also in the backup-side optical path 123-2 on the return path. However, in this example, both the outgoing path and the return path are switched to the backup signal lines. Therefore, as for the return path, there is a case where a switch is made from the normal active signal line 122-2 to the backup signal line 123-2 in which the failure has occurred. After all, it is found out that if the 2×2 optical switch is used, the optical protection cannot be appropriately implemented.

Also in optical protection in other modes such as linear optical protection, and mesh optical protection, which differ from the ring optical protection described above, the optical add-drop multiplexer using the 2×2 optical switch cannot be applied to the present invention. In the networks in these modes, the optical transmitter 125-1 and the optical receiver 126-1, which are shown in FIG. 7, carry out communications with nodes that differ from each other, instead of carrying out communications in the same node. To be more specific, the optical receiver 126-1 is connected to a node on the upstream side of the WDM signal lines 120-1, 121-1, whereas the optical transmitter 125-1 is connected to a node on the downstream side of the WDM signal lines 120-2, 121-2. Therefore, for example, if the 2×2 optical switch 141-1 is switched to a through state when a failure occurs in the active signal line 120-1 on the upstream side, even the optical path 134 of the optical transmitter 125-1 connected to a completely irrelevant node will be disconnected. Accordingly, the optical protection cannot be normally achieved. Accordingly, the add switch and the drop switch are allowed to be independently switched so that these optical switches are switched in the event of a failure. This point is an indispensable requirement for the present invention.

Figure 3:
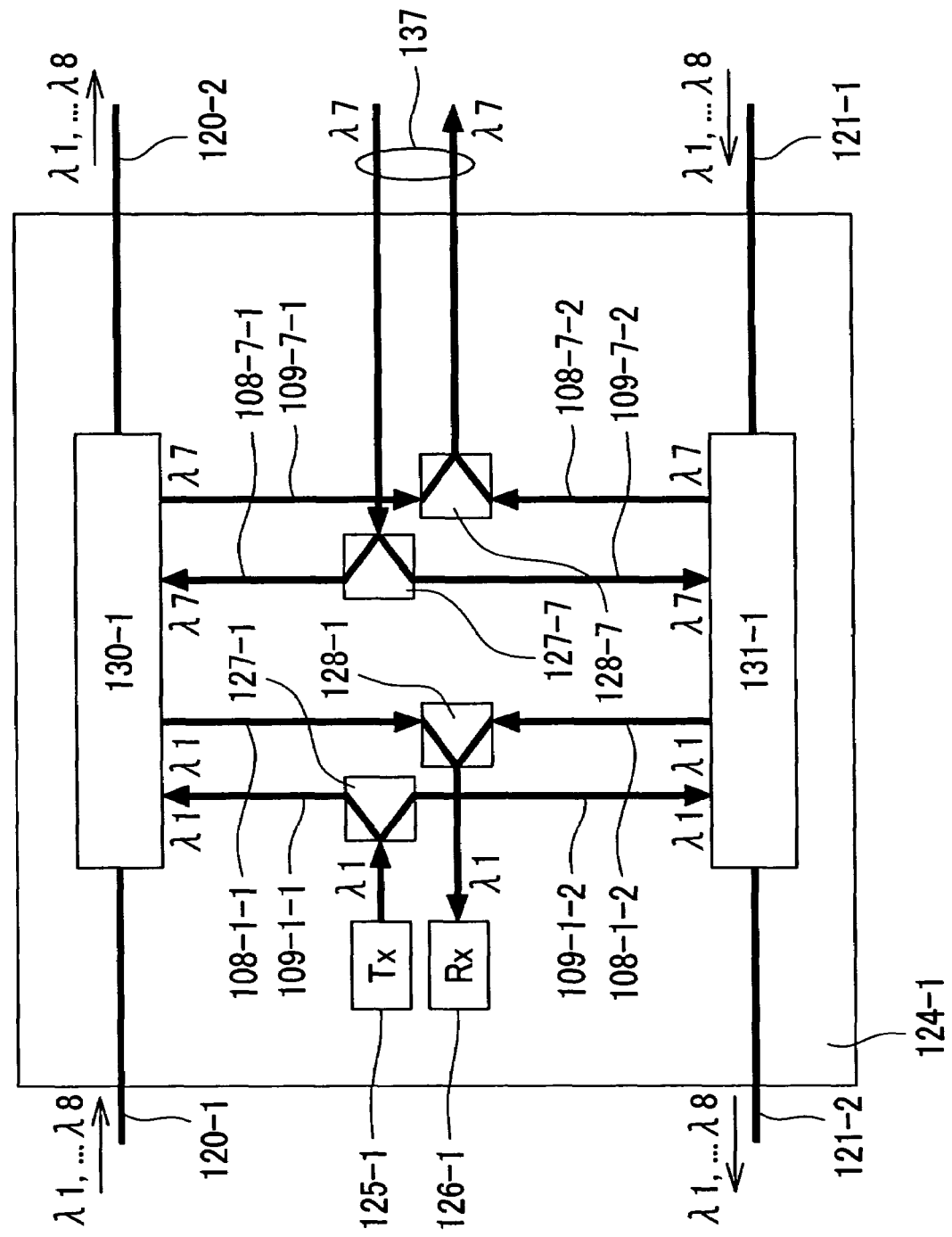
FIG. 3 is a diagram illustrating the configuration of a node according to the first embodiment of the present invention.

FIG. 3 is a diagram illustrating the configuration of a network node according to the first embodiment of the present invention. In each node, the active-side and backup-side optical add-drop multiplexers 130-1, 131-1 according to the present invention are located. These active-side and backup-side optical add-drop multiplexers 130-1, 131-1 are connected to the active-side and backup-side WDM optical fiber lines 120 and 121 respectively. An optical signal having the wavelength λ1 output from the transmitter 125-1 is branched into two by the 1:2 optical coupler 127-1. After that, the branched optical signals are connected to the add signal input optical fibers 109-1-1, 109-1-2 of the active-side and backup-side optical add-drop multiplexers 130-1, 131-1 according to the present invention, and are then added to both the active-side and backup-side WDM signal lines. Although omitted in FIG. 2, if this node is used in a two-fiber ring network, with the object of receiving an optical signal from the node at the other end, the active-side and backup-side drop signal output optical fibers 108-1-1, 108-1-2 are connected to the 2:1 optical coupler 128-1 so that coupled output is inputted into the optical receiver 126-1.

In the present invention, optical protection settings can be independently made for each of a plurality of optical signal lines in one node. In this example, in the case where the two-fiber ring network is used, also at a wavelength λ7, the active-side and backup-side add signal input optical fibers 109-7-1, 109-7-2 are connected to the 1:2 optical coupler 127-7, and the drop signal output optical fibers 108-7-1, 108-7-2 are connected to the 2:1 optical coupler 128-7, so that the input/output optical signal line 137 corresponding to the wavelength λ7 is provided with the 1+1 optical protection. As shown in the figure, the input/output WDM signal line may also be taken out to the outside of this node so that this input/output WDM signal line is connected to external optical transmission equipment or another network. In another case, the input/output WDM signal line may also be connected to another optical transceiver or another optical transmission equipment inside the node, or to another network. Incidentally, although the optical transmitter 125-1 and the optical receiver 126-1 are used to communicate with the same node in the two-fiber optical ring network, the optical transmitter 125-1 and the optical receiver 126-1 are not always used to communicate with the same node in an optical ring network, a linear network, or a mesh network, each of which has four fibers or more. Therefore, as shown in the figure, there may also be a case where one of a pair of optical transceivers is connected to the active-side and backup-side WDM optical fiber lines 120, 121, whereas the other optical transceiver is connected to another WDM signal line (for example, backward direction).

Table 1 in FIG. 18 is a table illustrating state transition of the optical switches according to the first embodiment of the present invention. This example shows only the optical add-drop multiplexer in the node 124-2 in FIG. 2. However, so long as a node which is an input/output point of the 1+1 optical protection is used, this example can also be applied to other nodes in the same manner. Because the 1+1 optical protection adopts a method in which a normal signal line is selected on the receiving side, an add switch used for transmission signal line is always set to an add state, and in the event of a failure or when restoring (switching back) from the failure, drop switches of the active-side and backup-side optical add-drop multiplexers 130-1, 131-1 on the farthest downstream side corresponding to the receiving end are switched. To be more specific, as far as a light wavelength to be dropped in this node, at the time of normal operation, an active-side drop switch is set to a drop state, whereas a backup-side drop switch is set to a non-drop state, before the operation. If a failure 132 has occurred in the active-side signal line through which an optical signal is received by this node, the active-side drop switch is set to a non-drop state, whereas the backup-side drop switch is set to a drop state, so that an optical signal on the backup signal line side is received. As a result, it is possible to preserve the optical signal in which the failure has occurred. Incidentally, in nodes other than input/output points, all of the add-drop switches each corresponding to the wavelength λ1 are always kept in a through state before operation.

Incidentally, although the number of multiplexed wavelengths is consistently eight in the example described above, the number of wavelengths is not limited to this value in reality. Any number selected from one as the minimum value to 100 or more, which is used in general wavelength division multiplexing transmission equipment, may also be used. In addition, it is not always necessary to use all wavelengths and all wavelength paths for actual transmission of optical signals. An unused wavelength may also exist. Moreover, according to the present invention, although the most part of the optical protection functions is implemented in the optical add-drop multiplexer, it is not always necessary to use these functions. Even in the same network, whether or not the functions are used can also be independently set on a wavelength path basis.

Additionally, the failure described in the present invention includes many phenomena, which largely degrade a transmission state of an optical signal, causing the optical signal not to be transmitted, such as a rapid increase in loss due to cut, bending, and aging, of a fiber, degradation in transmitted signal quality (increase in bit error ratio), a failure of equipment, and a failure of a node. In the description below, if expressed as an optical add-drop multiplexer on the adjacent upstream side (or on the adjacent downstream side), this optical add-drop multiplexer on the adjacent upstream side (or on the adjacent downstream side) corresponds to an optical add-drop multiplexer adjacent to an optical fiber section, a node, or equipment, in which a failure has occurred, on the upstream side (or on the downstream side), or corresponds to an optical add-drop multiplexer that has first detected the failure on the upstream side (or on the downstream side).

In addition, although the add signal input optical fiber 109, the drop signal output optical fiber 108, the WDM optical fiber line 120, and the like, were described using a general implementation mode of optical fibers, in actuality it is not always necessary to use optical fibers. Accordingly, as part of the implementation, add and drop signals may also be inputted and output from an input-output port such as an optical fiber connector; or a spatial optical beam in space, or a WDM signal line in an optical waveguide, may also be used. Moreover, an extension patch cable, or the like, may also be arbitrarily added to a connection part.

Further, this example does not show the existence of parts including an optical amplifier, a variable optical attenuator, an optical gain equalizer, and an optical filter. This is because only functions indispensable to the present invention are displayed. These parts may also be arbitrarily placed if necessary. Incidentally, functions which are the same as those of the optical parts such as the 1×2 optical switches shown in the present invention can also be realized by using a plurality of parts in combination, for example, by placing a variable optical attenuator at each of two output parts of the 1:2 optical coupler. Likewise, paying attention to the optical switches, the 1×2 and 2×1 optical switches have only minimum functions. Accordingly, it is also possible to replace each of the 1×2 and 2×1 optical switches with a 2×2 optical switch or a larger scale optical switch, and to use only part of the 2×2 or larger scale optical switch. In addition, these optical switches and other parts can also be configured in a one-unit optical module, or can also be implemented by integrating them on a glass waveguide substrate as the same optical circuit.

According to the present invention, it becomes possible to achieve the optical protection function without using external active parts including an optical switch and an optical switch control circuit.

Moreover, it becomes possible to use a plurality of different optical protection methods in a manner that these optical protection methods coexist with one another.

Furthermore, when a failure occurs, the optical protection is achieved by switching the add switch and the drop switch that are small-scale 1×2 and 2×1 optical switches. Therefore, very high-speed optical protection becomes possible.

Second Embodiment

FIG. 4 is a schematic view illustrating a second embodiment of the present invention. FIG. 4 illustrates the configuration of a node 124-1 in which a failure detection circuit 135 is built into an optical add-drop multiplexer according to the present invention, and in which a two-output two-input optical transceiver 138 is used. In this example, part of an optical signal corresponding to each wavelength output from the optical wavelength demultiplexers 102-1, 102-2 is dropped, and is then introduced into the failure detection circuit 135. Failure information of the active signal line, which has been detected by the active-side failure detection circuit 135-1 corresponding to the wavelength λ1, is branched into two. Then, both of the branched failure information are inputted into the active-side and backup-side optical switch control circuits 106-1, 106-2 corresponding to the wavelength λ1 respectively. Likewise, failure information of the backup signal line, which has been detected by the backup-side failure detection circuit 135-2 corresponding to the wavelength λ1, is also branched into two. Then, both of the branched failure information are inputted into the active-side and backup-side optical switch control circuits 106-1, 106-2 corresponding to the wavelength λ1 respectively. For example, like the optical switch control circuit 106-1, each of the optical switch control circuit generates an add-switch control signal 112-1 and a drop-switch control signal 113-1 to set states of these switches.

In order to achieve the 1+1 optical protection, the active-side switch control circuit 106-1 always keep the add switch 105-1 in an add state. At the time of normal operation, the active-side switch control circuit 106-1 switches the drop switch 103-1 to a drop state as shown in the figure. As soon as the failure detection circuit 135-1 notifies the active-side switch control circuit 106-1 that a failure has occurred on the active signal line side, the active-side switch control circuit 106-1 checks the failure detection circuit 135-2 on the backup signal line side to confirm that the backup signal line is normal. Then, the active-side switch control circuit 106-1 switches the drop switch 103-1 to a non-drop state. In addition, the backup-side switch control circuit 106-2 always keep the add switch 105-2 in an add state. A the time of normal operation, the backup-side switch control circuit 106-2 switches the drop switch 103-2 to a non-drop state as shown in the figure. As soon as the failure detection circuit 135-1 notifies that a failure has occurred on the active signal line side, it is confirmed in like manner that the backup signal line is normal. Then, the drop switch 103-2 is switched to a drop state. Configuring them in this manner makes it possible to build a node having the optical protection function by use of the optical add-drop multiplexers 130, 131 according to the present invention, and thereby to achieve autonomous optical protection.

Incidentally, in the 1+1 optical protection described in this example, if the drop switch is switched to a non-drop state, as is the case with for example the backup-side optical path 139, an optical signal passes through the drop switch 103-2, and is then inputted into the add switch 105-2 as leak signal light. However, because the add switch is always kept in an add state, the leak signal light of the optical path 139 is blocked at the input of the add switch. Therefore, no bad influence is exerted.

Moreover, a two-input two-output optical transceiver 138 is configured to include the optical transmitter 125-1, the optical receiver 126-1, the 1:2 optical coupler 127-1, and the 2:1 optical coupler 128-1, which are implemented as one body. It is possible to achieve the 1+1 or 1:1 ring optical protection according to the present invention simply and easily by connecting two input ports, and two output ports, of the optical transceiver 138 to four optical fibers of the active-side and backup-side drop signal output optical fibers 108-1, 108-2, and the active-side and backup-side drop signal output optical fibers 108-1, 108-2 according to the present invention.

In particular, the 1:2 optical coupler 127-1 and the 2:1 optical coupler 128-1 are very small-size passive parts. Therefore, building the 1:2 optical coupler 127-1 and the 2:1 optical coupler 128-1 into the transceiver in this manner eliminates the need for external parts, and accordingly increases the modularity of each part. As a result, compact implementation becomes possible. Incidentally, if the two-input two-output optical transceiver 138 is used for general optical protection, two output ports and two input ports are connected respectively to the active side, and the backup side, of WDM signal lines that differ from each other (for example, forward direction and backward direction). However, even in this case, the above-mentioned effects are the same. Incidentally, it is also possible to include beforehand the optical couplers in either of the active optical add-drop multiplexer or the backup optical add-drop multiplexer or in both of them.

Circuits in various modes, each of which has various kinds of functions, can be adopted as the failure detection circuit so long as the circuits can judges a failure state of an optical signal line. For example, there are the following circuits and methods: a circuit for judging the intensity of an optical signal by use of a photo detector and a threshold decision circuit; a circuit for detecting a line failure state by checking the existence of a specified clock frequency using a photo detector and a clock extraction circuit in combination; and a method that uses an optical performance monitor for measuring, for example, a Q value, a signal to noise ratio, and a bit error ratio, of an optical signal, and the size of eye opening. Incidentally, it is not always necessary to detect the failure information on the basis of information in this node. Information supplied from the outside of the node may also be properly utilized. For example, such information is supplied from another transmission equipment or another supervisory system of a light amplifier, which is located away from the node.

Third Embodiment

Figure 8:
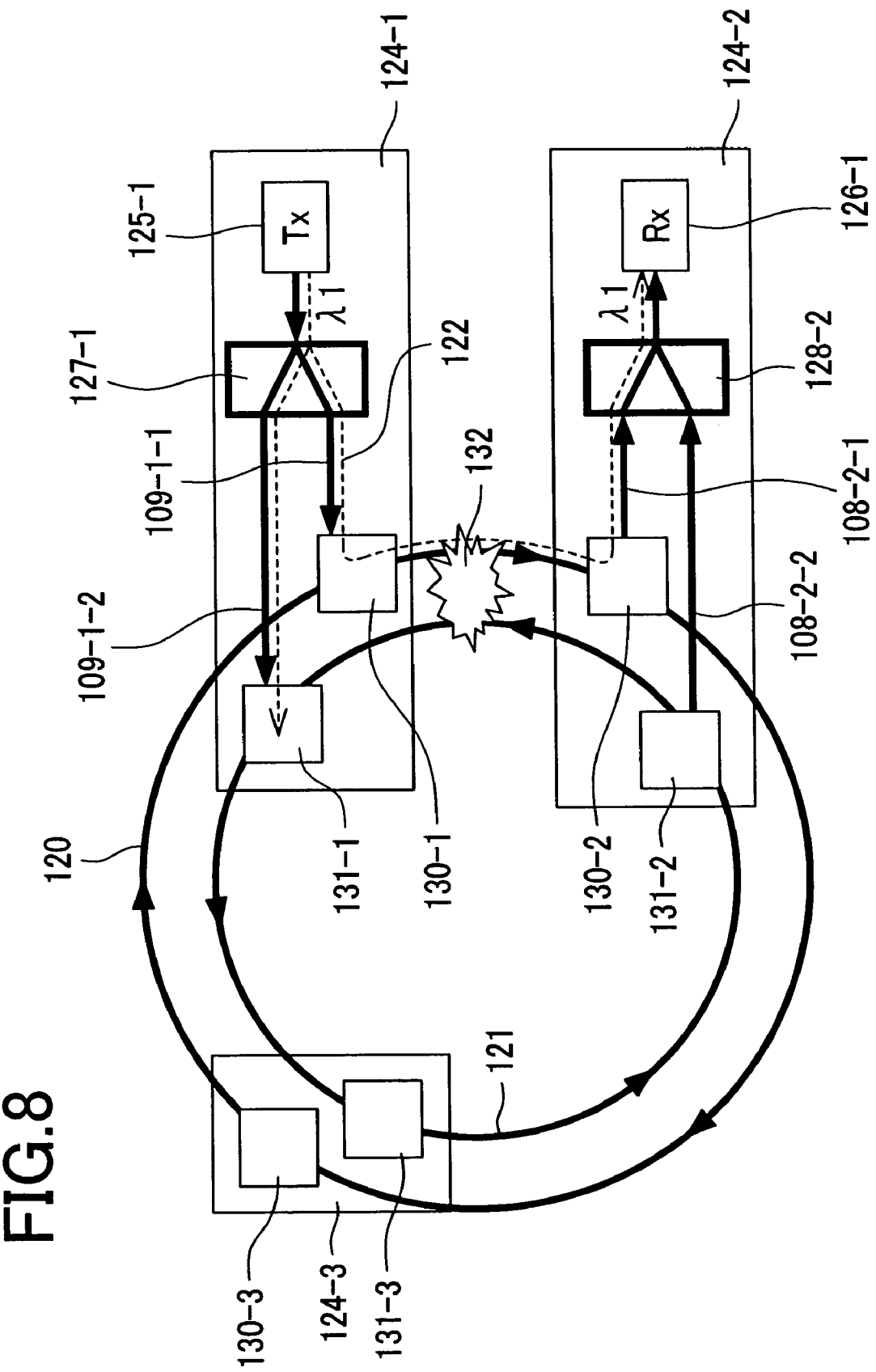
FIG. 8 is a schematic view illustrating a third embodiment of the present invention.

FIG. 8 is a diagram illustrating a third embodiment of the present invention. FIG. 8 illustrates an example in which 1:1 optical protection is implemented in a two-fiber ring network according to the present invention. The configuration in a transmission node 124-1-and that in a receiving node 125-1 are the same as the configuration of the 1+1 optical protection shown in FIG. 2. According to the present invention, it is possible to select an arbitrary optical protection mode if necessary by changing settings of software.

The 1:1 optical protection adopts a mode in which an optical signal is transmitted to only a normal optical fiber line on the transmission side. In a normal state, as shown in FIG. 19, an add switch corresponding to the wavelength λ1 in the active-side optical add-drop multiplexer 130-1 included in the transmission node 124-1 is set to an add state; and an add switch corresponding to the wavelength λ1 in the backup-side optical add-drop multiplexer 131-1 is set to a non-add state. If a failure in the active signal line 122 is detected, states of both add switches are inverted to add an optical signal only to a backup-side signal line so that an optical signal arrives at the receiving node 124-2 only through a backup-side path.

Incidentally, it is not always necessary to change the switch on the drop side. Accordingly, the drop-side switch may also be kept in a drop state all the time. However, noise light is output from an output optical fiber on the drop side, causing optical transmission characteristics to be degraded, which is also a problem. Therefore, at the time of normal operation, the backup-side drop switch may also be switched to a non-drop state. On the other hand, in the event of a failure, an active-side drop switch may also be switched to a non-drop state.

Fourth Embodiment

Figure 9:
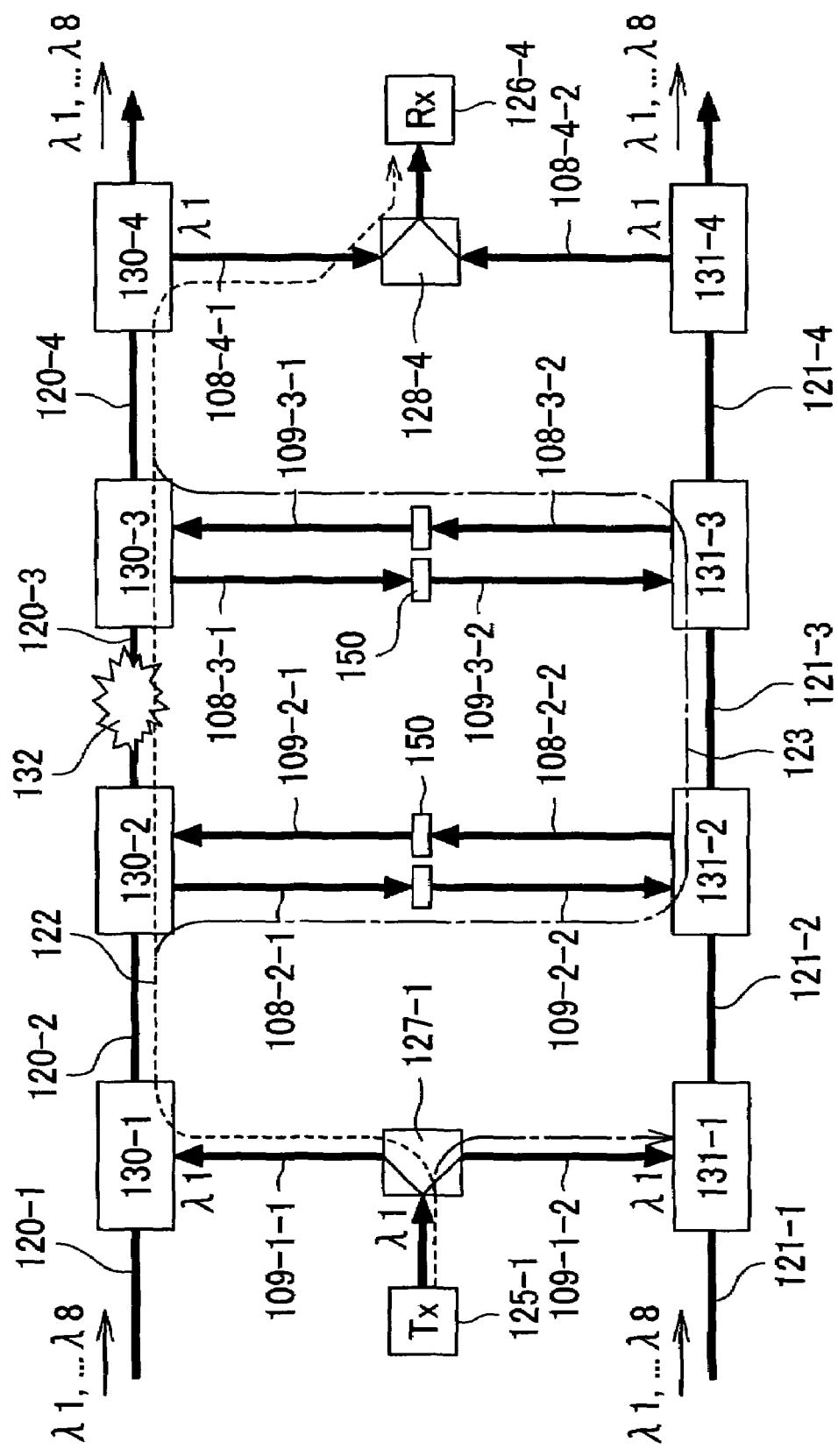
FIG. 9 is a schematic view illustrating a fourth embodiment of the present invention.

FIG. 9 is a diagram illustrating a fourth embodiment of the present invention. FIG. 9 illustrates an example in which the present invention is applied to the span-switch optical protection in an optical network having a linear configuration. In this example, the active WDM optical fiber line 120 and the backup WDM optical fiber line 121 are used to transmit optical signals in the same path in the same direction. Such a network in general becomes a four-fiber network in which active and backup signal lines in the backward direction are further located in the same path. However, in this example, the path in the backward direction path is omitted. In the middle of each of the active WDM optical fiber line 120 and the backup WDM optical fiber line 121, four network nodes, which is provided with one of the active-side and backup-side optical add-drop multiplexers 130-1 through 130-4 and 131-1 through 131-4 respectively, are located. The optical transmitter 125-1 and the optical receiver 126-4 are located and configured in a similar manner to the above-mentioned embodiments. The optical transmitter 125-1 and the optical receiver 126-4 are connected to the active-side and backup-side optical add-drop multiplexers 130-1, 131-1, 130-4, 131-4 through the optical couplers 127-1, 128-4 respectively. On the other hand, as for the nodes corresponding to the active-side and backup-side optical add-drop multiplexers 130-2, 130-3, 131-2, 131-3, for example, the drop signal output optical fiber 108-2-1 corresponding to the wavelength λ1 from the active-side optical add-drop multiplexer 130-2 and the add signal input optical fiber 109-2-2 from the backup-side optical add-drop multiplexer 131-2 are connected to each other through junction points 150. Likewise, the backup-side drop signal output optical fiber 108-2-2 corresponding to the wavelength λ1 and the active-side add signal input optical fiber 109-2-1 are connected to each other through the junction points 150. As a result of the above settings, a drop signal on one side can be inputted as an add signal on the other side. The junction points 150 are shown as junction points of the optical fibers for reasons of convenience. Therefore, even if the junction points 150 do not exist as physical objects, no problem arises.

FIG. 20 is a table 3 illustrating states of optical switches described in this example. At the time of normal operation, optical switches corresponding to the wavelength λ1 are set as follows: setting an add switch in the active-side optical add-drop multiplexer 130-1 to an add state; setting add switches 130-2, 130-3 to a non-add state; setting drop switches 130-1, 130-3 to a non-drop state; and setting a drop switch 130-4 to a drop state. As a result of the above settings, an active-side optical signal travels from the optical transmitter 125-1 to the optical receiver 126-4 through a path 122 indicated with a dotted line. On the other hand, on the backup signal line side, for example, all add-drop switches are set to a non-add non-drop state.

If a failure 132 occurs in the active-side WDM optical fiber line 120-3, as soon as the active-side optical add-drop multiplexers 130-2, 130-3, which are located on the adjacent upstream side and on the adjacent downstream side respectively, detect the occurrence of the failure, the former sets the drop switch to a drop state, and the latter sets the add switch to an add state. At the same time, the backup-side optical add-drop multiplexer 131-2 which has been notified of failure information switches the add switch to an add state, and the backup-side optical add-drop multiplexer 131-3 notified of the failure information switches the drop switch to a drop state, so that a path for making a detour around a point of failure is created. As a result, as indicated by a path 123, the optical signal makes a detour away from the failure 132, and accordingly passes through a backup signal line, and then returns to the active signal line 120-4 again. Such optical protection is based on a method for making a detour around a failure on an optical fiber span basis. This optical protection is called an optical span switch in the present invention.

Incidentally, in this example, only the nodes equipped with the optical transmitter 125-1 or the optical receiver 126-1 are configured differently from the other nodes. More specifically, each of these differently configured nodes includes an optical coupler for connecting the optical transmitter 125-1 or the optical receiver 126-1 to the optical add-drop multiplexers both on the active side and on the backup side. The object of the above configuration is to cope with a failure occurring immediately before or immediately after these nodes. To be more specific, if an optical signal of the optical transmitter 125-1 is inputted into only the active-side optical add-drop multiplexer 130-1, in the event that a failure occurs in this active-side WDM signal line 120-2 that is located immediately after the active-side optical add-drop multiplexer 130-1, there is no means for passing through the optical signal to the backup side, and consequently the recovery from the failure becomes impossible. It is to be noted that switching states in the event of a failure are similar to those of the other nodes. More specifically, in the active-side and backup-side optical add-drop multiplexers 130-1, 131-1, the add switches are switched to a non-add state and an add state respectively. On the other hand, in the active-side and backup-side optical add-drop multiplexers 130-4, 131-4, the drop switches are switched to a non-drop state and a drop state respectively.

In this example, at the time of normal operation, all backup-side add-drop switches are kept in a non-add non-drop state. However, because no optical signal having the wavelength λ1 exists in the backup-side WDM optical fiber line 121, it is not always necessary to keep them in the non-add non-drop state. However, if all of the add-drop switches are kept in the non-add non-drop state, the backup-side signal line corresponding to the wavelength λ1 is kept in a through state, which means that no optical signal exists in the backup-side signal line. Accordingly, the backup-side signal line can be used to transmit other optical signals. This makes it possible to enhance the cost effect according to the present invention. As a matter of course, this optical signal cannot be transmitted if a failure occurs. Therefore, optical signals to be transmitted on the backup side should be extra traffic whose priority is low.

Incidentally, the above 1+1 optical protection, and the above 1:1 optical protection, according to the present invention can also be realized by use of even such a linear network or a general mesh optical network. In this case, an optical signal to be used, that is to say, either an active-side optical signal or a backup-side optical signal, is selected on the receiving side or on the transmission side, and a switch between the active path and the backup path is made as a whole. For this purpose, as is the case with the above embodiments, only in the nodes equipped with the optical transmitter 125-1 and the optical receiver 127-1, an optical signal is connected to the active and backup signal lines by use of the optical couplers. Then, the optical switches in the active and backup optical add-drop multiplexers at the receiving end or at the transmission end are switched as shown in FIGS. 18, 19 and Tables 1, 2.

According to the present invention, it is possible to achieve optical protection with high cost effect, with increased failure resistivity, and with high reliability.

Fifth Embodiment

Figure 10:
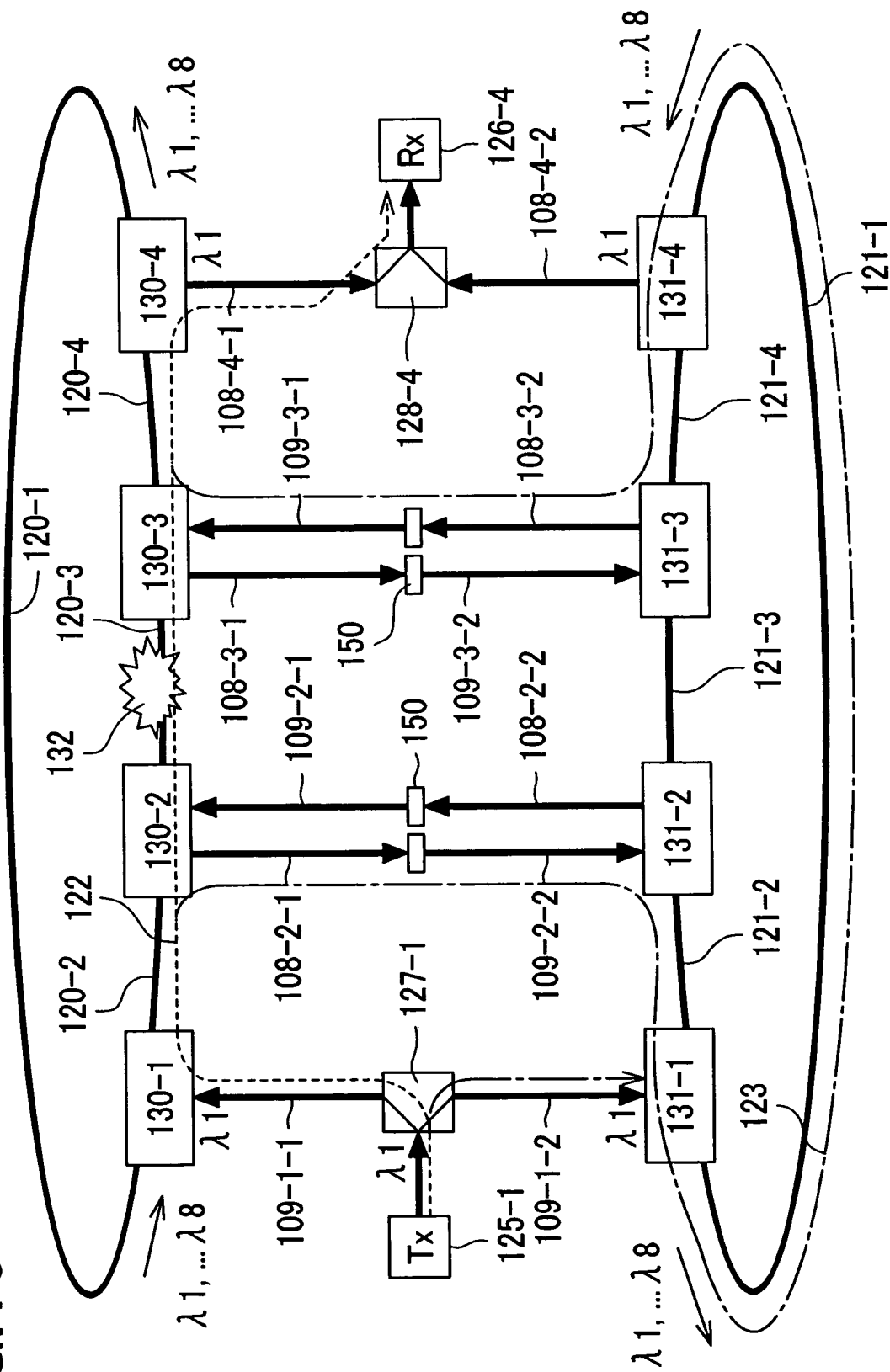
FIG. 10 is a schematic view illustrating a fifth embodiment of the present invention.

FIG. 10 is a diagram illustrating a fifth embodiment of the present invention. FIG. 10 illustrates an example in which ring-switch optical protection for switching back an optical signal before and after a point of failure is achieved in a ring-optical network. In this example, the active WDM optical fiber line 120 and the backup WDM optical fiber line 121 are used to transmit optical signals in directions reverse to each other in the ring network. Such a network in general has a four-fiber configuration in which another pair of active and backup signal lines are further located. However, only a pair of active and backup signal lines is illustrated in this example. In the middle of each of the active WDM optical fiber line 120 and the backup WDM optical fiber line 121, four network nodes, which is provided with one of the active-side and backup-side optical add-drop multiplexers 130-1 through 130-4 and 131-1 through 131-4 respectively, are located. Connections and the configuration in each node is the same as those described in the above embodiments with the exception that an optical signal passes through the backup signal line in the reverse direction. In addition, steps of switching optical switches are also the same as those shown in Table 3 of FIG. 20.

If a failure 132 occurs in the active signal line 120-3, the active-side optical add-drop multiplexers 130-2, 130-3 immediately before and immediately after the failure detect the occurrence of the failure. Then, the former sets the drop switch to a drop state, and the latter sets the add switch to an add state. At the same time, the backup-side optical add-drop multiplexer 131-2 notified of failure information switches the add switch to an add state, and the backup-side optical add-drop multiplexer 131-3 notified of the failure information switches the drop switch to a drop state. Points which differ from the example given above are that the direction of the backup path is in reverse, and that a detour is made around a point of failure by passing an optical signal through a path on the opposite side of the ring network. This is because there is a high possibility that the backup signal line 121-3 taking the same path as that of the active signal line 120-3 may be influenced by a failure such as fiber cut at the same time. As a result, it is possible to achieve the optical protection with high recoverability in the event of a failure and with high reliability.

Sixth Embodiment

Figure 11:
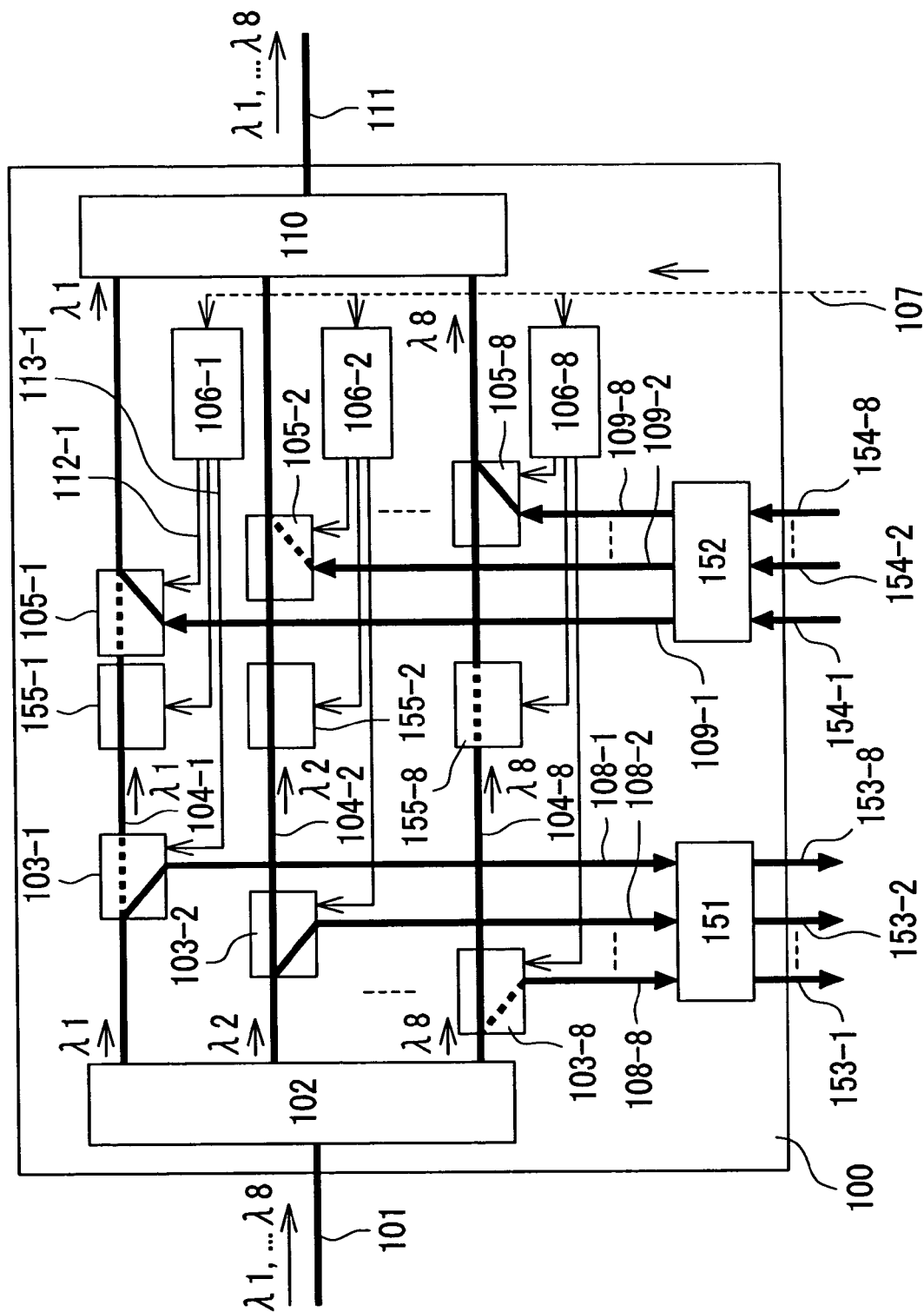
FIG. 11 is a schematic view illustrating a sixth embodiment of the present invention.

FIG. 11 is a schematic view illustrating a sixth embodiment according to the present invention. This is an example in which each through signal path is provided with a through signal interruption switch 155 so that the influence of leak signal light is reduced, and in which a N-input N-output matrix switch used for drop signals 151 and a N-input N-output matrix switch used for add signals 152 are located so as to increase the flexibility, and the quick responses, of the optical protection function.

The through signal interruption switches 155-1 through 155-8 are located immediately after the drop switches 103-1 through 103-8 in the through signal paths 104-1 through 104-8 respectively. In the optical protection according to the present invention, if the drop switch 103-N is switched to a non-drop state in an unused backup system, or the like, there is a case where an unnecessary signal light may be inputted into the subsequent add switch 105-N as leak signal light. In principle, by setting an unused add switch to an add state, it is possible to block the leak signal light, and thereby to suppress the influence thereof. However, a special case to be considered is a case where, for example, this wavelength division multiplexing transmission equipment 100 is connected to a backup-side WDM signal line of a linear network, and where 1+1 optical protection is performed for a signal received from the WDM signal line 101 corresponding to the wavelength λ8, whereas 1:1 optical protection is performed for a signal transmitted from the WDM signal line 111 corresponding to the same wavelength λ8. In this case, it is necessary to switch the drop switch 103-8 to a non-drop state, and to switch the add switch 105-8 to a non-add state, before performing the above-mentioned protection. However, because the 1+1 optical protection is used on the upstream side, leak signal light coming from the upstream side through the drop switch 103-8 passes through the add switch 105-8 just as it is, and then interferes with the 1:1 optical protection operation at a subsequent stage, resulting in an inoperative state.

The through signal interruption switches 155-N are used to avoid such a malfunction, and are controlled by the optical switch control circuits 106-N respectively so that the leak signal light does not pass through a subsequent add switch, or so that the leak signal light is suppressed. Control logic is simple. If no effective through signal exists, more specifically, if this node is an end point, or a start point, of an optical path corresponding to each wavelength, the through signal interruption switch is set to an interrupted state. On the other hand, if a through signal exists, the through signal interruption switch is set to a pass-through state.

Incidentally, because the through signal interruption switch needs to operate only at the time of settings of wavelength paths, high-speed switching is not always required. Accordingly, the function of the through signal interruption switch can also be achieved by inserting a variable optical attenuator so as to change its loss, or other means. Moreover, it is also possible to integrate the through signal interruption switch, the add switch, and the drop switch into the same module or an integrated device.

In this example; N-input N-output matrix switch used for drop signals 151 (in this example, N=8) are located in output parts of the eight drop signal output optical fibers 108-1 through 108-8; and N-input N-output matrix switch used for add signals 152 are located in input parts of the eight add signal input optical fibers 109-1 through 109-8. The former has a switching function of allowing one of optical signals, which are output from the eight drop signal output optical fibers 108-1 through 108-8, to be freely output to one of the eight matrix switch output fibers 153-1 through 153-8 respectively. In addition, the latter has a switching function of allowing one of add signals, which are inputted into the eight matrix switch input fibers 154-1 through 154-8, to be freely output to one of the eight add signal input optical fiber 109-1 through 109-8 respectively. It is possible to freely change a connection state by means of remote control through a network. The functions of this switch will be described in the below embodiment.

In this example, the N-input N-output matrix switch is used. However, in actuality, there are few cases where all optical signals are added/dropped in one optical add-drop multiplexer. Therefore, no problem arises if the number of matrix switch input/output fibers is N or less. For example, it is possible to replace the matrix switch 151 with an 8-input 4-output matrix switch, or the like, and thereby to reduce the scale of the switch and the number of input/output fibers, with the result that the costs can be reduced. Moreover, the matrix switch may also be configured in a different manner or be differently located so long as the above-mentioned functions can be achieved. For example, the two matrix switches 151, 152 may also be substituted with an integral-type 2N×2N matrix switch; each matrix switch may also be realized by using several optical switches in combination; or only add drop fibers may also be partially replaced with each other. Thus, small-scale matrix switches may also be located.

Seventh Embodiment

Figure 12:
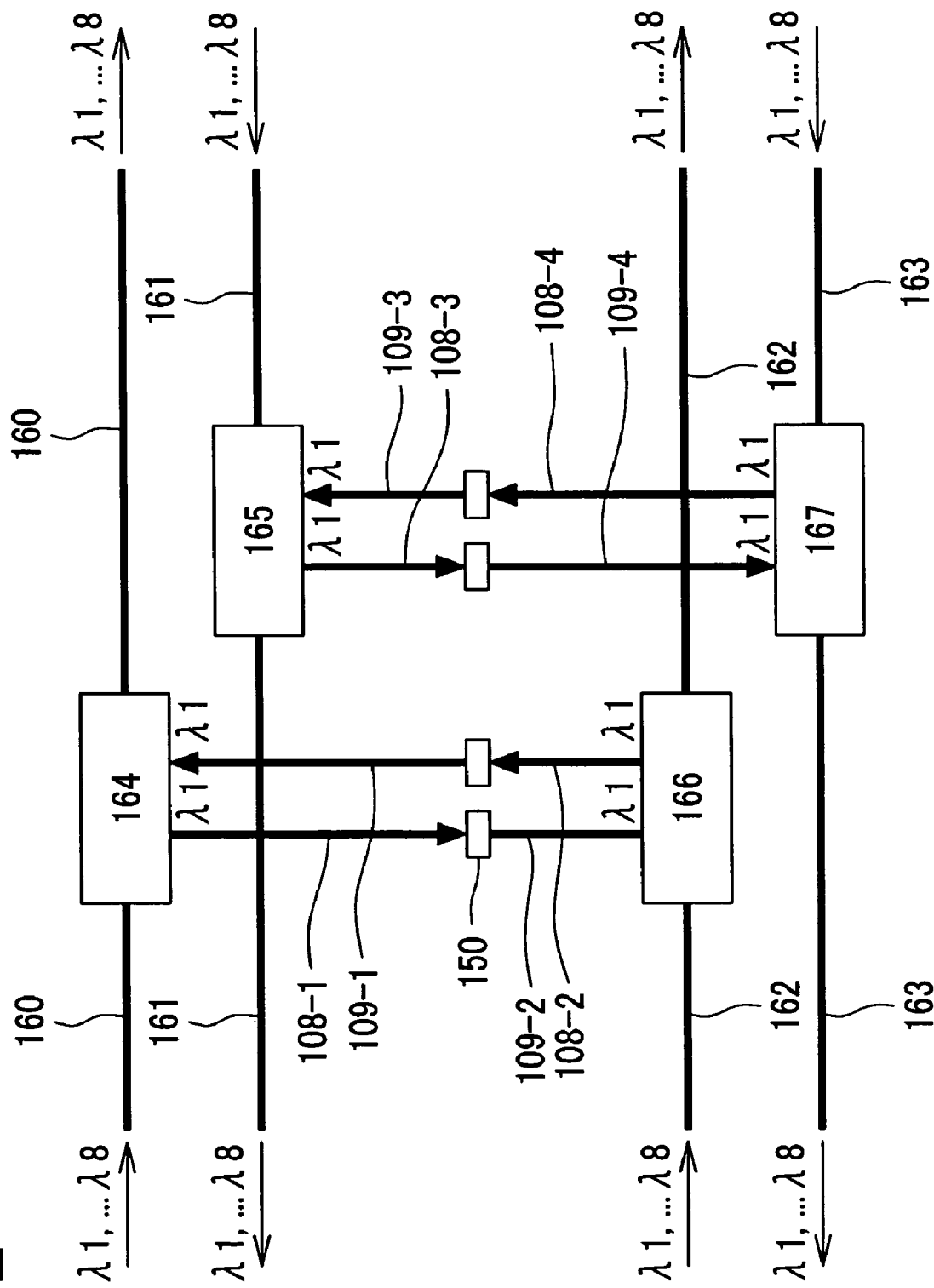
FIG. 12 is a schematic view illustrating a seventh embodiment of the present invention.

FIG. 12 is a schematic view illustrating a seventh embodiment according to the present invention. FIG. 12 is a diagram illustrating connections and the configuration of optical add-drop multiplexers in relay nodes except transmission and receiving ends, said optical add-drop multiplexers being required to achieve an optical span switch that is optical protection according to the present invention. In a wavelength division multiplexed optical network having a four-fiber configuration, which is broadly used, four signal lines are used. The four signal lines are forward-direction and backward-direction active WDM optical fiber lines 160, 161, and forward-direction and backward-direction backup WDM optical fiber lines 162, 163. Forward-direction and backward-direction active optical add-drop multiplexers 164, 165, and forward-direction and backward-direction backup optical add-drop multiplexers 166, 167 are located in the four signal lines respectively. In order to enable the span switch, as shown in the figure, drop signal output optical fibers 108-1, 108-2 corresponding to the same wavelength (for example, the wavelength λ1) from the forward-direction active and backup optical add-drop multiplexers 164, 166 are connected to the add signal input optical fibers 109-2, 109-1 respectively. This makes it possible to detour, in this node, an active signal having the wavelength λ1 in the forward direction to a backup system, and also to return the optical signal in the backup system to an active system in reverse. Also in the backward-direction active and backup optical add-drop multiplexers 165, 167, as shown in the figure, the drop signal output optical fibers 108-3, 108-4 corresponding to the same wavelength λ1 are connected to the add signal input optical fibers 109-4, 109-3 respectively. This makes it possible to apply the same optical span switch also to information traffic in the backward direction.

It is not always necessary to do the configuration setup of this optical node at the time of starting the operation of the network. Carrying out wiring in each node when the optical protection is required after starting the operation suffices. However, in this case, every time the optical protection is required, operation of connecting add drop fibers of the optical add-drop multiplexers, corresponding to the wavelength in question, to each other with patch cables is required in all relay nodes, which leads to an increase in costs and a delay in the start of services.

In order to avoid the above-mentioned problems, the placement of the optical matrix switches to the add drop fibers as shown in the last embodiment is effective. In this case, instead of connecting the drop signal fiber and the add signal fiber, both of which correspond to a specific wavelength, between the active and backup optical add-drop multiplexers, arbitrary fibers selected among matrix switch output fibers and matrix switch input fibers between these optical add-drop multiplexers in all nodes are connected beforehand. If the connections are made in such a manner, when an optical protection function corresponding to a certain specific wavelength is required in future, this optical protection can be achieved by remotely switching the matrix switch so that in relay nodes other than the transmission and receiving ends, the add signal input optical fiber and the drop signal output optical fiber, both corresponding to the specific wavelength, are connected to input/output fibers of matrix switches that are interconnected to each other as shown in FIG. 12 beforehand. This eliminates the need for the site work in each node, which makes it possible to reduce the costs, and to shorten the setup time, to a large extent. Incidentally, if several sets of interconnections between matrix switches as described above are prepare beforehand, even when the optical protection is further required for a plurality of wavelength paths, it is possible to cope with it immediately. As far as the optical add-drop multiplexers are concerned, because an actual usage rate of add signal fibers, the number of which is N, and drop signal fibers, the number of which is N, for each optical add-drop multiplexer is in general from 25% to 50%, the input/output fibers 153, 154 of the N×N matrix switches 151, 152 shown in FIG. 11 are mostly unused. Accordingly, no problem arises even if the interconnections are made beforehand as described above.

Eighth Embodiment

Figure 13:
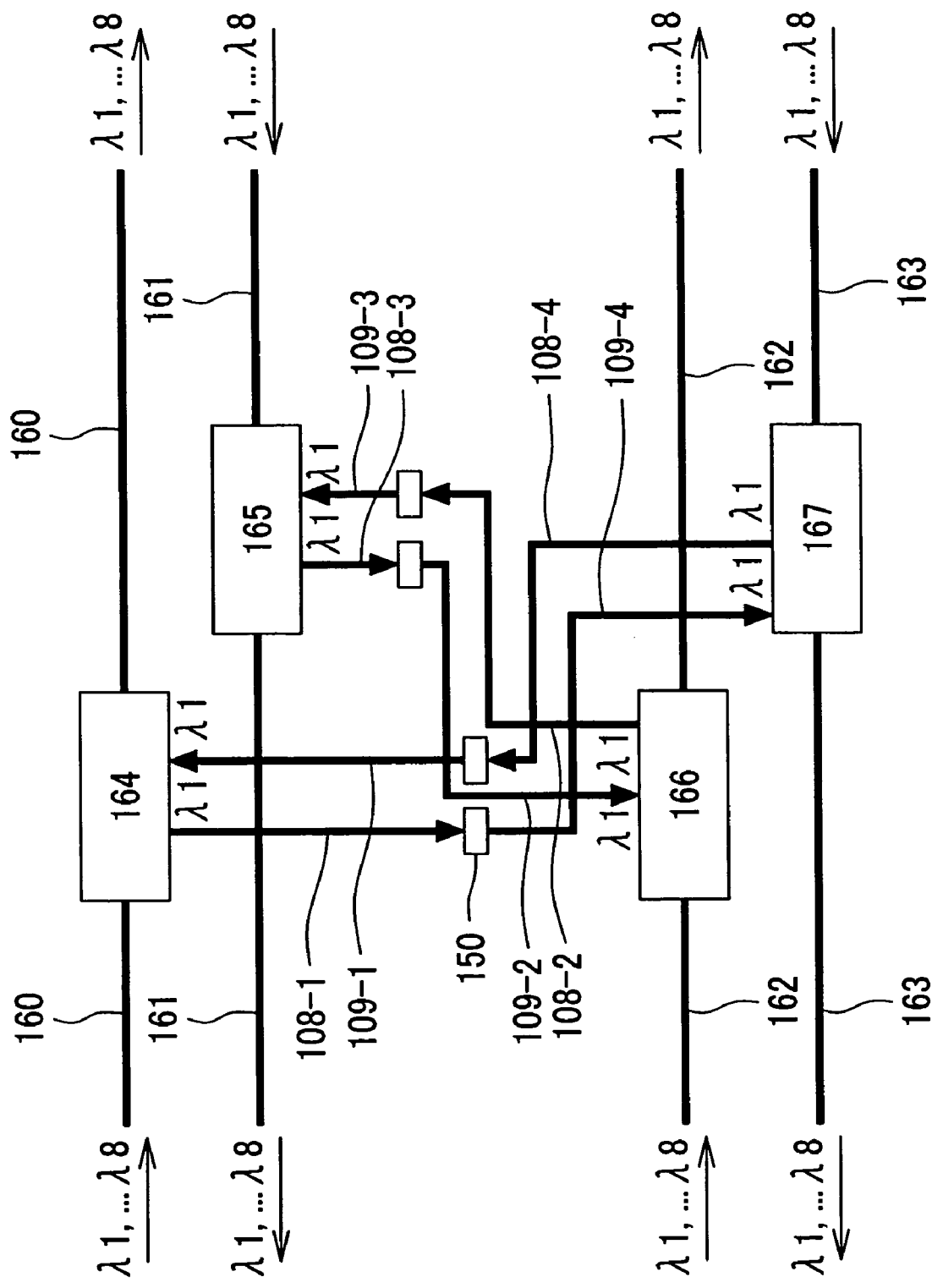
FIG. 13 is a schematic view illustrating an eighth embodiment of the present invention.

FIG. 13 is a schematic view illustrating an eighth embodiment according to the present invention. FIG. 13 is a diagram illustrating connections and the configuration of optical add-drop multiplexers in relay nodes except transmission and receiving ends, said optical add-drop multiplexers being required to achieve an optical ring switch that is optical protection according to the present invention. As is the case with the above embodiment, the forward-direction and backward-direction active optical add-drop multiplexers 164, 165 and the forward-direction and backward-direction backup optical add-drop multiplexers 166, 167 are interconnected. In order to enable a ring switch, as shown in the figure, the drop signal output optical fibers 108-1, 108-4 corresponding to the same wavelength (for example, the wavelength λ1) from the forward-direction active optical add-drop multiplexer 164 and from the backward-direction backup optical add-drop multiplexer 167 are connected to the add signal input optical fibers 109-4, 109-1 respectively. This makes it possible to detour, in this node, an active signal having the wavelength λ1 in the forward direction to a backup system in the backward direction, and also to return the optical signal of the backup system in the backward direction to an active system in the forward direction. Also in the backward-direction active optical add-drop multiplexer 165 and the forward-direction backup optical add-drop multiplexer 166, as shown in the figure, the drop signal output optical fibers 108-3, 108-2 corresponding to the same wavelength λ1 are connected to the add signal input optical fibers 109-2, 109-3 respectively. This makes it possible to apply the same optical ring switch also to traffic in the backward direction. Also in this example, as is the case with the above embodiments, the application of the matrix switches is effective.

Ninth Embodiment

Figure 14:
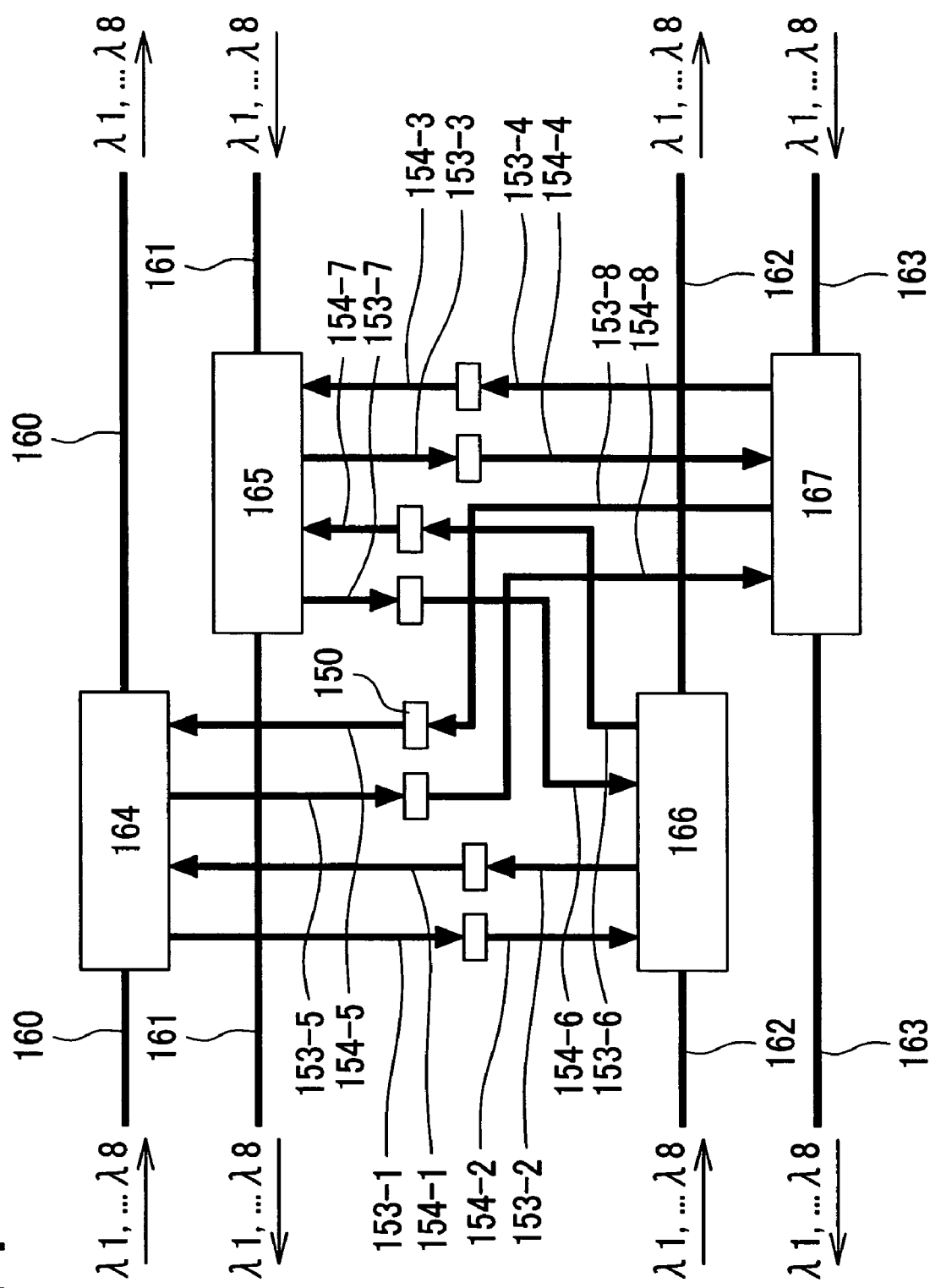
FIG. 14 is a schematic view illustrating a ninth embodiment of the present invention.

FIG. 14 is a schematic view illustrating a ninth embodiment according to the present invention. FIG. 14 is a diagram illustrating connections and the configuration of optical add-drop multiplexers in a node. The connections and the configuration are used to achieve both an optical span switch and an optical ring switch that are optical protection according to the present invention, and are also used for interconnections of a mesh optical network and an optical ring network that are more generally used.

In order to make both of the optical span switch and the optical ring switch usable in a four-fiber network, matrix switches 151, 152 shown in FIG. 11 are located in the optical add-drop multiplexer. An object of the above configuration is to allow an optical signal having a wavelength λN in the active signal line, which is an object of the optical protection, to be detoured to a backup signal line in the forward direction or a backup signal line in the backward direction. To be more specific, paying attention to the forward-direction active optical wavelength division multiplexing transmission equipment 164, matrix switch output fibers 153-1, 153-5 thereof are connected to matrix switch input fibers 154-2, 154-8 of the forward-direction and backward-direction backup optical wavelength division multiplexing transmission equipment 166, 167 respectively. In addition, matrix switch input fibers 154-1, 154-5 are connected to matrix switch output fibers 153-2, 153-8 of the forward-direction and backward-direction backup optical wavelength division multiplexing transmission equipment 166, 167 respectively. On the other hand, paying attention to the backward-direction active optical wavelength division multiplexing transmission equipment 165, matrix switch output fibers 153-7, 153-3 thereof are connected to matrix switch input fibers 154-6, 154-4 of the forward-direction and backward-direction backup optical wavelength division multiplexing transmission equipment 166, 167 respectively. In addition, matrix switch input fibers 154-7, 154-3 are connected to matrix switch output fibers 153-6, 153-4 of the forward-direction and backward-direction backup optical wavelength division multiplexing transmission equipment 166, 167 respectively. This makes it possible to freely apply the span switch and the ring switch to the active signal lines.

Incidentally, from the viewpoint of switching speed, it is effective to switch the matrix switches before the actual operation of the optical protection so that add drop signal fibers are connected to matrix output fibers as required. For example, if a ring switch is applied to a signal line corresponding to the wavelength λ1, a matrix switch should be properly set in a manner that an add signal input optical fiber and a drop signal output optical fiber, both corresponding to the wavelength λ1, are connected as shown in FIG. 13. To be more specific, in the case where the optical add-drop multiplexer 100 shown in FIG. 11 is used as the forward-direction active optical add-drop multiplexer 164 shown in FIG. 14, the matrix switch 152 in FIG. 11 is set in a manner that the drop signal output optical fiber 108-1 corresponding to the wavelength λ1 is connected to the matrix switch output fiber 153-5 in FIG. 14, whereas the add signal input optical fiber 109-1 is connected to the matrix switch input fiber 154-5 in FIG. 14. The other matrix switches are also set in like manner.

Figure 16:
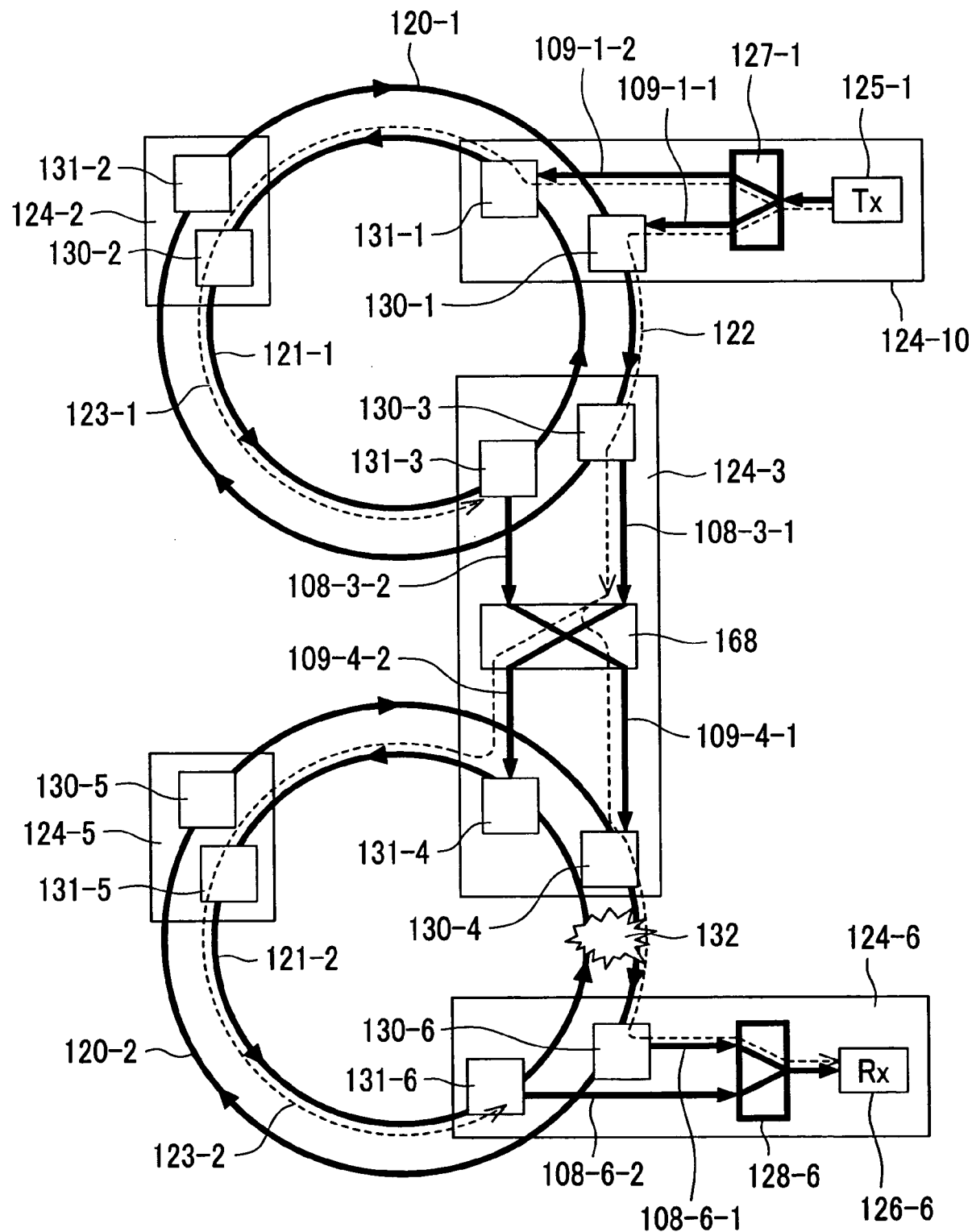
FIG. 16 is a schematic view illustrating an eleventh embodiment of the present invention.

Incidentally, besides the method that uses the matrix switches, as another configuration that can be used, a 2:1 optical coupler and a 1:2 optical coupler are located in the add signal input optical fiber and the drop signal output optical fiber respectively, both corresponding to the wavelength in question, so as to drop signals, which are then connected to a forward-direction signal line and a backward-direction signal line. An optical coupler, the number of branches is larger than that of the above-mentioned optical couplers, may also be used. In addition, as shown in FIG. 16 described later, a 2:2 optical coupler 168 may also be used to reduce the number of couplers.

Moreover, the configurations shown in FIGS. 12, 13, 14 are also effective as wiring in a node when the optical protection according to the present invention is utilized in interconnections of the mesh optical network and the optical ring network that are more generally used. In these networks, the backup signal lines are handled by further generalizing these backup signal lines. Accordingly, treating the forward-direction and backward-direction active WDM optical fiber lines 160, 161 as the first forward-direction and backward-direction WDM optical fiber lines, and treating forward-direction and backward-direction backup WDM optical fiber lines 162, 163 as the second forward-direction and backward-direction WDM optical fiber lines, suffice. The first and second WDM optical fiber lines are not always required to correspond to the same path. The first and second WDM optical fiber lines may also be signal lines forming wavelength division multiplexed networks that completely differ from each other. In general, if the configuration shown in FIG. 12 is used, optical signals in the forward direction in the first and second networks can be mutually detoured to signal lines in the forward direction on the opposite side. On the other hand, if the configuration shown in FIG. 13 is used, optical signals in the first and second networks can be mutually detoured to signal lines in the backward direction on the opposite side. Moreover, if the configuration shown in FIG. 14 is used, it becomes possible to detour optical signal in either direction.

According to the present invention, using simple optical wiring, it is possible to achieve optical protection with high functionality, such as optical protection relating to a span switch or a ring switch, and optical protection of optical signals across a plurality of networks.

Tenth Embodiment

Figure 15:
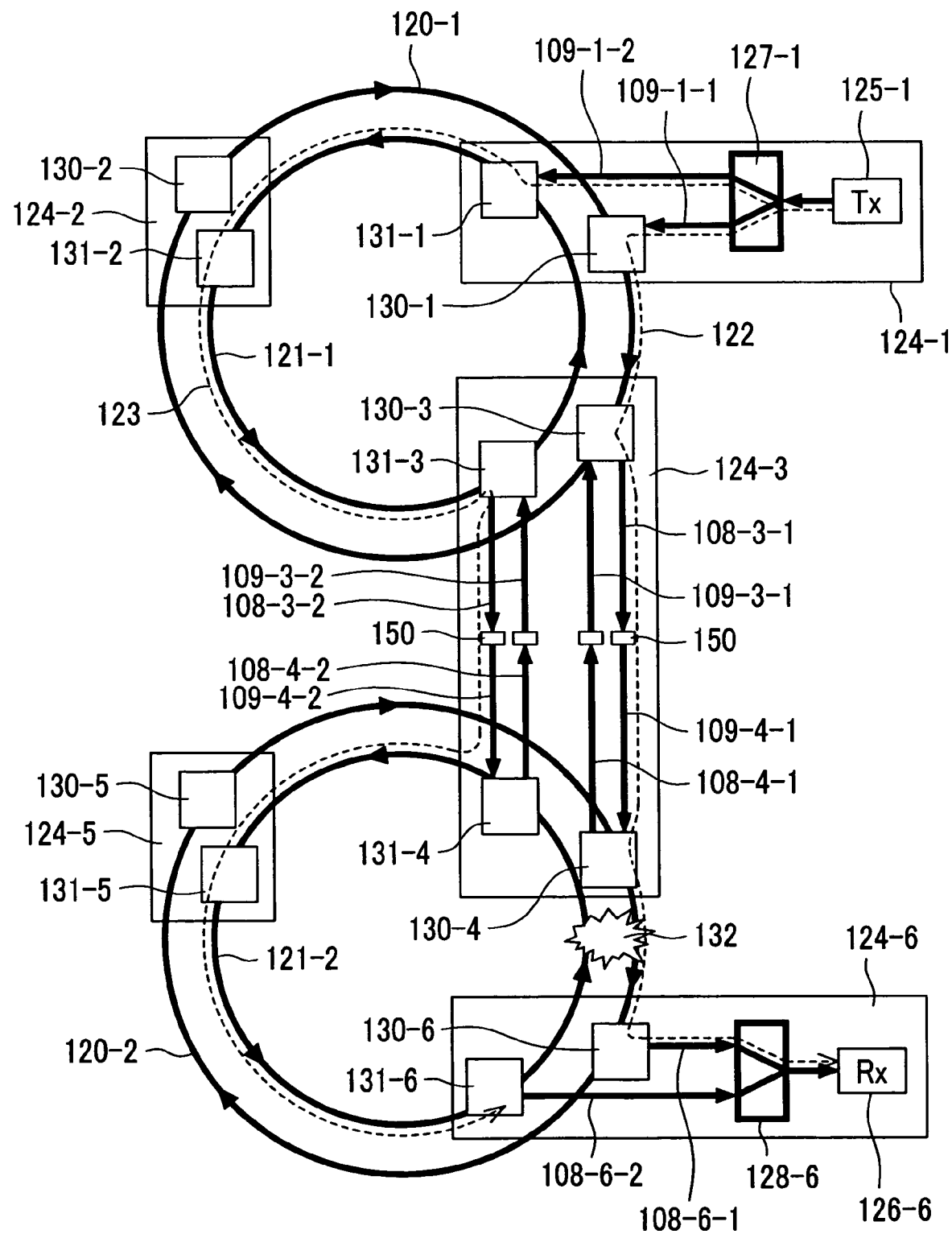
FIG. 15 is a schematic view illustrating a tenth embodiment of the present invention.

FIG. 15 is a schematic view illustrating a tenth embodiment according to the present invention. FIG. 15 illustrates an example in which by use of the above-mentioned connections in the node, the 1+1 or 1:1 optical protection according to the present invention is made applicable to wavelength paths across two different wavelength division multiplexed optical ring networks. In this example, both of the networks are two-fiber rings. The first optical network comprises the active-side-WDM optical fiber line 120-1, and the backup-side WDM optical fiber line 121-1 through which an optical signal passes in the reverse direction. The second optical network comprises the active-side WDM optical fiber line 120-2, and the backup-side WDM optical fiber line 121-2 through which an optical signal passes in the reverse direction. In this example, a signal line corresponding to the wavelength $\lambda 1$ is provided from a node 124-1 in the first network to a node 124-6 in the second ring via a node 124-3 that is common to both networks. The optical protection according to the present invention is applied to this signal line. In the common node 124-3, a drop signal output optical fiber 108-3-1 corresponding to the wavelength $\lambda 1$ of the active-side optical add-drop multiplexer 130-3 in the first optical network is connected to an add signal input optical fiber 109-4-1 corresponding to the wavelength $\lambda 1$ of the active-side optical add-drop multiplexer 130-4 in the second optical network. At the same time, also for the backup signal line, a drop signal output optical fiber 108-3-2 of the backup-side optical add-drop multiplexer 131-3 is connected to an add signal input optical fiber 109-4-2 corresponding to the wavelength $\lambda 1$ of the backup-side optical add-drop multiplexer 131-4 in the second optical network. Incidentally, a signal line through which an optical signal passes from a node 124-6 to a node 124-1 also exists at the same time. Therefore, in the node 123-3, a drop signal output optical fiber 108-4-1 corresponding to the wavelength $\lambda 1$ of the active-side optical add-drop multiplexer 130-4 in the second optical network is connected to an add signal input optical fiber 109-3-1 corresponding to the wavelength $\lambda 1$ of the active-side optical add-drop multi-plexer 130-3 in the second optical network. Further, a drop signal output optical fiber 108-4-2 of the backup-side optical add-drop multiplexer 131-4 is also connected to an add signal input optical fiber 109-3-2 corresponding to the wavelength $\lambda 1$ of the backup-side optical add-drop multiplexer 131-3.

If the 1+1 optical protection for a signal line corresponding to the wavelength $\lambda 1$ is carried out, add switches corresponding to the wavelength $\lambda 1$ of the optical wavelength add-drop multiplexers 130-1, 131-1, 130-4, 131-4 are always kept in an add state, whereas drop switches corresponding to the wavelength $\lambda 1$ in the optical wavelength add-drop multiplexers 130-3, 131-3 are always kept in a drop state, so that an optical signal passes through both a path 122 for an active optical signal and a path 123 for a backup optical signal, shown in the figure, and arrives at the optical wavelength add-drop multiplexers 130-6, 131-6 at the receiving end. At the time of normal operation, drop switches in the active and backup optical wavelength add-drop multiplexers 130-6, 131-6 at the receiving end are set to a drop state and a non-drop state respectively. On the other hand, in the event that a failure 132 occurs in the active signal line, drop switches in the active and backup optical wavelength add-drop multiplexers 130-6, 131-6 are switched to a non-drop state and a drop state respectively. As a result, in the event of a failure, the optical signal passing through the backup path 123 is received by a receiver 126-6. This makes it possible to achieve the 1+1 optical protection across the different optical networks according to the present invention.

If the 1:1 optical protection is required for the signal line corresponding to the wavelength $\lambda 1$, connections and the configuration in the node, and a state of the optical switch, are the same except that not the drop switch at the receiving end but the add switch at the transmission end is switched. To be more specific, all of the drop switches described above are always kept in a drop state. In addition, the add switches in the active and backup optical wavelength add-drop multiplexers 130-4, 131-4 in the relay node are also always kept in an add state; and the add switches in the active and backup optical wavelength add-drop multiplexers 130-1, 131-1 at the transmission end are set to an add state and a non-add state respectively. Moreover, in the event that the failure 132 occurs in the active signal line, switching the add switches in the active and backup optical wavelength add-drop multiplexers 130-1, 131-1 to a non-add state and an add state respectively suffices. As a matter of course, as is the case with the other 1:1 optical protection, the drop switches in the active and backup optical wavelength add-drop multiplexers 130-6, 131-6 at the receiving end may also be switched to a non-drop state and a drop state respectively at the same time.

Eleventh Embodiment

FIG. 16 is a schematic view illustrating an eleventh embodiment according to the present invention. FIG. 16 illustrates an example in which the 1+1 or 1:1 optical protection is further made applicable on a network basis to wavelength paths across two different wavelength division multiplexed optical ring networks. In the previous embodiment, when a failure occurs, switching to the backup path is made both in the first and second optical networks. Therefore, if both of the ring networks encounter a failure (that is to say, in total two failures (multiple failures) occur), there is a possibility that the optical signal line may be cut off. In this example, even if both of the rings encounter a failure, it becomes possible to transmit an optical signal by performing the 1+1 optical protection, the 1:1 optical protection, or the like, only in a ring in which a failure has occurred. This makes it possible to increase the failure resistivity. To achieve this optical protection, a 2:2 optical coupler 168 is located in a node 124-3 that is a junction point of the optical networks. Then, drop signal output optical fibers 108-3-1, 108-3-2 corresponding to the wavelength λ1 of the active and backup optical wavelength add-drop multiplexer 130-3, 131-3 in the first optical network are connected to input ports of the optical coupler 168. In addition, two output ports of the optical coupler 168-2 are connected to the add signal input optical fibers 109-4-1, 109-4-2 corresponding to the wavelength λ1 of the active and backup optical wavelength add-drop multiplexer 130-4, 131-4 in the second optical network respectively. Incidentally, FIG. 15 illustrates only a path of an optical signal from the node 124-1 to the node 124-6. However, in actuality, with the object of performing the same optical protection also for an optical signal in the reverse direction from the node 124-6 to the node 124-1, another pair of optical fibers and a 2:1 optical coupler in a direction completely reverse to that indicated in the figure are located in the node 124-3 to pass through this optical signal in reverse.

If the 1+1 optical protection for a signal line corresponding to the wavelength λ1 is achieved, add switches corresponding to the wavelength λ1 are always kept in an add state in the optical wavelength add-drop multiplexers 130-1, 131-1, 130-4, 131-4, each of which is an input point of each network. In the optical wavelength add-drop multiplexers 130-3, 131-3, 130-6, 131-6, each of which is an output point of each network, usually, the active-side drop switches corresponding to the wavelength λ1 are set to a drop state, the backup-side drop switches corresponding to the wavelength λ1 are set in a non-drop state, so that only an active-side optical signal is supplied to a subsequent network or a subsequent optical receiver. A failure is detected and judged on a network basis. In the event of a failure, the active-side drop switch, which is an output point of each network, is set to a non-drop state, whereas the backup-side drop switch is set to a drop state, so that an optical signal passing through the backup-side path is supplied to a subsequent network or a subsequent optical receiver. The network connection node 124-3 is equipped with the optical coupler 168. Therefore, if the active-side optical signal or the backup-side optical signal is supplied from the first optical network, the supplied optical signal is branched into two, which are then supplied to both the active side and the backup side in the second optical network respectively. As a result, similar optical protection can be achieved even in the second optical network. This makes it possible to achieve the 1+1 optical protection on a ring basis.

In addition, if the 1:1 optical protection for a signal line corresponding to the wavelength λ1 is achieved, drop switches corresponding to the wavelength λ1 are always kept in a drop state in the optical wavelength add-drop multiplexers 130-3, 131-3, 130-6, 131-6, each of which is an output point of each network. In the optical wavelength add-drop multiplexers 130-1, 131-1, 130-4, 131-4, each of which is an input point of each network, usually, the active-side add switches corresponding to the wavelength λ1 are set to an add state, whereas the backup-side add switches corresponding to the wavelength λ1 are set in a non-add state, so that using only an active line, an optical signal is supplied to a subsequent network or a subsequent optical receiver. A failure is detected and judged on a network basis. In the event of a failure, the active-side add switch, which is an input point of each network, is set to a non-add state, whereas the backup-side add switch is set to an add state, so that an optical signal passing through the backup-side path is supplied to a subsequent network or a subsequent optical receiver. This makes it possible to achieve the 1:1 optical protection on a ring basis.

Twelfth Embodiment

Figure 17:
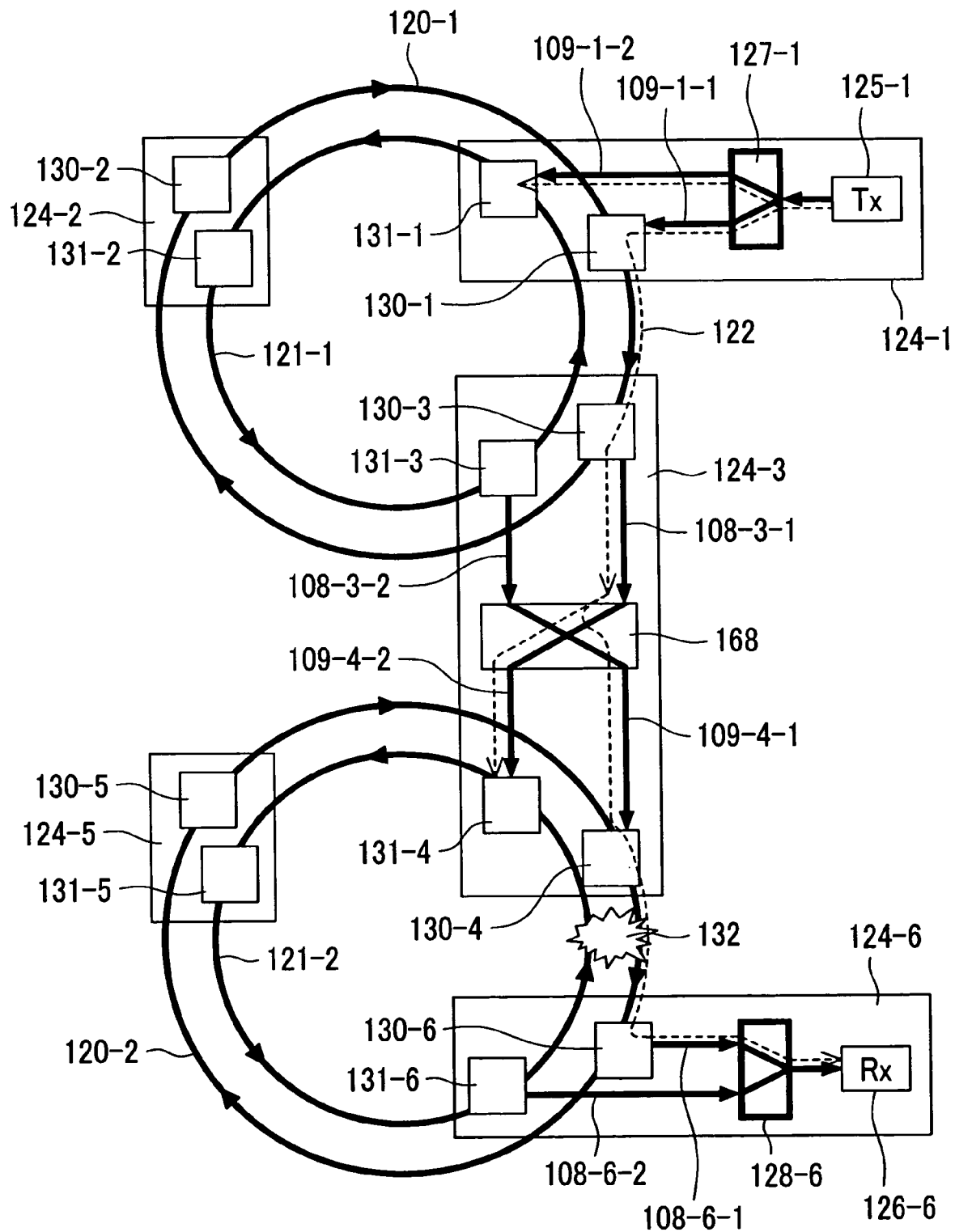
FIG. 17 is a schematic view illustrating a twelfth embodiment of the present invention.

FIG. 17 is a schematic view illustrating a twelfth embodiment according to the present invention. FIG. 17 illustrates an example in which the optical protection by a span switch is further made applicable to wavelength paths across two different wavelength division multiplexed optical ring networks. In this embodiment, in the case where both ring networks have a four-fiber configuration, a failure is dealt with by detouring an optical signal from the clockwise active-side WDM optical fiber line 120 to the clockwise backup-side WDM optical fiber line 121. If such a span switch is used, the switching caused by a failure in the first network does not exert an influence upon the optical path in the second network. Accordingly, the switching does not change the number of multiplexed wavelengths in the second ring. As a result, optical transmission characteristics in the second network become stable, which is one of advantages of using the span switch. In addition, even if a failure occurs in one network, this failure does not cause switching in the other network. Accordingly, extra traffic transmitted through the backup signal line in the other network is not influenced, leading to high economical efficiency, which is another advantage. In this example, the first and second networks are optical ring networks. However, the first and second networks need not always be optical ring networks. They may also be linear networks or mesh networks.

If this optical protection is applied to an optical signal corresponding to the wavelength λ1, a 2:2 optical coupler 168 is located in a node 124-3 that is a junction point of the optical networks. In addition, the drop signal output optical fibers 108-3-1, 108-3-2 corresponding to the wavelength λ1 of the active and backup optical wavelength add-drop multiplexer 130-3, 131-3 in the first optical network are connected to input ports of the optical coupler 168. Moreover, two output ports of the optical coupler 168-2 are connected to the add signal input optical fibers 109-4-1, 109-4-2 corresponding to the wavelength λ1 of the active and backup optical wavelength add-drop multiplexer 130-4, 131-4 in the second optical network respectively. Usually, in the optical wavelength add-drop multiplexers 130-1, 131-1, 130-4, 131-4, each of which is an input point of each network, the active-side add switches corresponding to the wavelength λ1 are set to an add state, whereas the backup-side add switches are set to a non-add state. On the other hand, in the optical wavelength add-drop multiplexers 130-3, 131-3, 130-6, 130-6, each of which is an output point, the active-side drop switches are set to a drop state, whereas the backup-side drop switches are set to a non-drop state. If a failure occurs in a certain network, an active-side add switch of an optical add-drop multiplexer, which is an input point of the network in question, is switched to a non-add state. In addition, a backup-side add switch is switched to an add state. On the other hand, an active-side drop switch of the optical add-drop multiplexer, which is of an output point, is switched to a non-drop state. In addition, a backup-side drop switch is switched to a drop state.

It is to be noted that, as is the case with this embodiment, a ring switch can also be configured on an optical network basis.

Incidentally, the reference numerals used in the diagrams of the application concerned will be listed as below.

100 Optical add-drop multiplexer (OADM) according to the present invention
101 Input WDM optical fiber line
102 Optical wavelength demultiplexer
103 1×2 optical switch (drop switch)
104 Through signal path 105 2×1 optical switch (add switch)
106 Optical switch control circuit
107 Failure information
108 Drop signal output optical fiber
109 Add signal input optical fiber
110 Optical wavelength multiplexer
111 Output WDM optical fiber line
112 Add-switch control signal
113 Drop-switch control signal
120 Active-side WDM optical fiber line
121 Backup-side WDM optical fiber line
122 Path of an active optical signal having the wavelength λ1
123 Path of a backup optical signal having the wavelength λ1
124 Node
125 Optical transmitter
126 Optical receiver
127 1:2 optical coupler (optical divider)
128 2:1 optical coupler (optical mixer)
130 Active-side optical add-drop multiplexer according to the present invention
131 Backup-side optical add-drop multiplexer according to the present invention
132 Failure
133 Path of received light having the wavelength λ1
134 Path of a transmitted light having the wavelength λ1
135 Failure detection circuit
136 Detection signal
137 Input/output optical signal line
138 Two-output two-input optical transceiver
139 Path of received light having the wavelength λ1 from a backup signal line
140 Conventional optical add-drop multiplexer
141 2×2 optical switch
142 2×1 optical switch
143 Conventional active-side optical add-drop multiplexer
144 Conventional backup-side optical add-drop multiplexer
145 Optical switch control circuit
150 Junction point
151 N-input N-output matrix switch used for drop signals
152 N-input N-output matrix switch used for add signals
153 Matrix switch output fiber
154 Matrix switch input fiber
155 Through signal interruption switch
160 Forward-direction active WDM optical fiber line
161 Backward-direction active WDM optical fiber line
162 Forward-direction backup WDM optical fiber line
163 Backward-direction backup WDM optical fiber line
164 Forward-direction active optical add-drop multiplexer according to the present invention
165 Backward-direction active optical add-drop multiplexer according to the present invention
166 Forward-direction backup optical add-drop multiplexer according to the present invention
167 Backward-direction backup optical add-drop multiplexer according to the present invention
168 2:2 optical coupler.

What is claimed is:

1. An optical add-drop multiplexer having a function of demultiplexing an inputted wavelength-division multiplexed signal on a wavelength length basis, and adding or dropping part or all of the demultiplexed optical signals on a wavelength basis, and then multiplexing these optical signals again before outputting the multiplexed signal, said optical add-drop multiplexer comprising:

an optical switch having a function of adding at least one optical signal having a desired wavelength to a WDM signal line through which the wavelength-division multiplexed signal is transmitted, or a function of dropping at least one optical signal having a desired wavelength from the WDM signal line;

said optical switch including an add switch capable of switching the optical signal from an add state to a non-add state and vice versa, and a drop switch capable of switching the optical signal from a drop state to a non-drop state and vice versa, said add switch and said drop switch being provided on the output side, and on the input side, of the optical add-drop multiplexer respectively;

a failure detection part for detecting a failure of an optical signal that may occur on the WDM signal line, or a failure information receiving part for receiving failure information from the outside;

an optical switch control circuit for switching the states of the add switch and the states of the drop switch; and means for inputting, into the optical switch control circuit, failure occurrence information coming from the failure detection part or the failure information receiving part, and for, when the failure occurrence information is detected or received, switching either the add switch or the drop switch, or both the add switch and the drop switch, on the basis of the information, wherein:

in the case where the optical add-drop multiplexers which are connected to active and backup WDM signal lines respectively are located on the farthest downstream side of the WDM signal lines, the optical add-drop multiplexer can be configured so that if the optical add-drop multiplexer is connected to the active WDM signal line, at the time of normal operation, the drop switch is switched to a drop state, whereas if a failure occurs on the WDM signal line, the drop switch is switched to a non-drop state, and so that if the optical add-drop multiplexer is connected to the backup WDM signal line, at the time of normal operation, the drop switch is switched to a non-drop state, whereas if a failure occurs on the WDM signal line, the drop switch is switched to a drop state.

2. An optical add-drop multiplexer according to claim 1, wherein:

a switch for blocking a through signal is located in each optical signal path corresponding to each wavelength.

3. An optical network in which the active-side and backup-side optical add-drop multiplexers according to claim 1 are located in active and backup WDM signal lines respectively, wherein:

optical network equipment according to claim 18 is located at input and output points of an optical signal from and to WDM signal lines, and the optical signal is transmitted from an input point on the farthest upstream side to an output point on the farthest downstream side by use of both the active WDM signal line and the backup WDM signal line;

said optical network equipment can be configured so that at the time of normal operation, the optical signal transmitted through an active-side optical path is dropped and received by drop switches of the active-side and backup-side optical add-drop multiplexers located on the farthest downstream side, and so that if the failure occurs, the drop switches of the active-side and backup-side optical add-drop multiplexers located on the farthest downstream side are switched to drop and receive the optical signal transmitted through a backup-side optical path.

4. An optical add-drop multiplexer having a function of demultiplexing an inputted wavelength-division multiplexed signal on a wavelength length basis, and adding or dropping part or all of the demultiplexed optical signals on a wavelength basis, and then multiplexing these optical signals again before outputting the multiplexed signal, said optical add-drop multiplexer comprising:
 an optical switch having a function of adding at least one optical signal having a desired wavelength to a WDM signal line through which the wavelength-division multiplexed signal is transmitted, or a function of dropping at least one optical signal having a desired wavelength from the WDM signal line;
 said optical switch including an add switch capable of switching the optical signal from an add state to a non-add state and vice versa, and a drop switch capable of switching the optical signal from a drop state to a non-drop state and vice versa, said add switch and said drop switch being provided on the output side, and on the input side, of the optical add-drop multiplexer respectively;
 a failure detection part for detecting a failure of an optical signal that may occur on the WDM signal line, or a failure information receiving part for receiving failure information from the outside;
 an optical switch control circuit for switching the states of the add switch and the states of the drop switch; and
 means for inputting, into the optical switch control circuit, failure occurrence information coming from the failure detection part or the failure information receiving part, and for, when the failure occurrence information is detected or received, switching either the add switch or the drop switch, or both the add switch and the drop switch, on the basis of the information, wherein:
 in the case where the optical add-drop multiplexers which are connected to active and backup WDM signal lines respectively are located on the farthest upstream side of the WDM signal lines,
 the optical add-drop multiplexer can be configured so that if the optical add-drop multiplexer is connected to the active WDM signal line, at the same time of normal operation, the add switch is switched to an add state, whereas if a failure occurs on the WDM signal line, the add switch is switched to a non-add state, and
 so that if the optical add-drop multiplexer is connected to the backup WDM signal line, at the time of normal operation, the add switch is switched to a non-add state, whereas if a failure occurs on the WDM signal line, the add switch is switched to an add state.

5. An optical add-drop multiplexer according to claim 4, wherein
 the optical add-drop multiplexer can be configured so that if the optical add-drop multiplexer is connected to the active WDM signal line, at the time of normal operation, the drop switch is switched to a drop state, whereas if a failure occurs on the WDM signal line, the drop switch is switched to a non-drop state, and
 so that if the optical add-drop multiplexer is connected to the backup WDM signal line, at the time of normal operation, the drop switch is switched to a non-drop state, whereas if a failure occurs on the WDM signal line, the drop switch is switched to a drop state.

6. An optical add-drop multiplexer according to claim 4, wherein:
 a switch for blocking a through signal is located in each optical signal path corresponding to each wavelength.

7. An optical add-drop multiplexer having a function of demultiplexing an inputted wavelength-division multiplexed signal on a wavelength length basis, and adding or dropping part or all of the demultiplexed optical signals on a wavelength basis, and then multiplexing these optical signals again before outputting the multiplexed signal, said optical add-drop multiplexer comprising:
 an optical switch having a function of adding at least one optical signal having a desired wavelength to a WDM signal line through which the wavelength-division multiplexed signal is transmitted, or a function of dropping at least one optical signal having a desired wavelength from the WDM signal line;
 said optical switch including an add switch capable of switching the optical signal from an add state to a non-add state and vice versa, and a drop switch capable of switching the optical signal from a drop state to a non-drop state and vice versa, said add switch and said drop switch being provided on the output side, and on the input side, of the optical add-drop multiplexer respectively;
 a failure detection part for detecting a failure of an optical signal that may occur on the WDM signal line, or a failure information receiving part for receiving failure information from the outside;
 an optical switch control circuit for switching the states of the add switch and the states of the drop switch; and
 means for inputting, into the optical switch control circuit, failure occurrence information coming from the failure detection part or the failure information receiving part, and for, when the failure occurrence information is detected or received, switching either the add switch or the drop switch, or both the add switch and the drop switch, on the basis of the information, wherein:
 in the case where the optical add-drop multiplexers which are connected to active and backup WDM signal lines respectively, if the optical add-drop multiplexer is connected to the active WDM signal line,
 the optical add-drop multiplexer can be configured so that if a failure occurs on the adjacent upstream side of the optical add-drop multiplexer located on the active WDM signal line, the add switch is switched to an add state, and
 so that if a failure occurs on the adjacent downstream side of the optical add-drop multiplexer located on the active WDM signal line, the drop switch is switched to a drop state.

8. An optical add-drop multiplexer according to claim 7, wherein:
 in the case where the optical add-drop multiplexers which are connected to the active and backup WDM signal lines respectively, if the optical add-drop multiplexer is connected to the backup WDM signal line,
 the optical add-drop multiplexer can be configured so that if a failure occurs on the adjacent upstream side of the active WDM signal line, the drop switch is switched to a drop state, and
 so that if a failure occurs on the adjacent downstream side of the active WDM signal line, the add switch is switched to an add state.

9. Optical network equipment comprising:
 the four optical add-drop multiplexers according to claim 7, said four optical add-drop multiplexers being the active-side forward direction optical add-drop multiplexer, the active-side backward direction optical add-drop multiplexer, the backup-side forward direction optical add-drop multiplexer, and the backup-side backward direction optical add-drop multiplexer, said four optical add-drop multiplexers being connected to forward-direction and backward-direction active WDM signal lines and forward-direction and backward-direction backup WDM signal lines respectively, wherein:

a drop signal output optical fiber of the active-side forward direction optical add-drop multiplexer is connected to an add signal input optical fiber of the backup-side forward direction optical add-drop multiplexer;

a drop signal output optical fiber of the backup-side forward direction optical add-drop multiplexer is connected to an add signal input optical fiber of the active-side forward direction optical add-drop multiplexer;

a drop signal output optical fiber of the active-side backward direction optical add-drop multiplexer is connected to an add signal input optical fiber of the backup-side backward direction optical add-drop multiplexer; and a drop signal output optical fiber of the backup-side backward direction optical add-drop multiplexer is connected to an add signal input optical fiber of the active-side backward direction optical add-drop multiplexer.

10. Optical network equipment comprising:

the four optical add-drop multiplexers, each add-drop multiplexer having an optical switch having a function of adding at least one optical signal having a desired wavelength to a WDM signal line through which the wavelength-division multiplexed signal is transmitted, or a function of dropping at least one optical signal having a desired wavelength from the WDM signal line;

said optical switch including an add switch capable of switching the optical signal from an add state to a non-add state and vice versa, and a drop switch capable of switching the optical signal from a drop state to a non-drop state and vice versa, said add switch and said drop switch being provided on the output side, and on the input side, of the optical add-drop multiplexer respectively;

a failure detection part for detecting a failure of an optical signal that may occur on the WDM signal line, or a failure information receiving part for receiving failure information from the outside;

an optical switch control circuit for switching the states of the add switch and the states of the drop switch; and means for inputting, into the optical switch control circuit, failure occurrence information coming from the failure detection part or the failure information receiving part, and for, when the failure occurrence information is detected or received, switching either the add switch or the drop switch, or both the add switch and the drop switch, on the basis of the information, wherein the optical add-drop multiplexer can be configured so that if the optical add-drop multiplexer is connected to the active WDM signal line, at the time of normal operation, the drop switch is switched to a drop state, whereas if a failure occurs on the WDM signal line, the drop switch is switched to a non-drop state, and so that if the optical add-drop multiplexer is connected to the backup WDM signal line, at the time of normal operation, the drop switch is switched to a non-drop state, whereas if a failure occurs on the WDM signal line, the drop switch is switched to a drop state, said four optical add-drop multiplexers being the active-side forward direction optical add-drop multiplexer, the active-side backward direction optical add-drop multiplexer, the backup-side forward direction optical add-drop multiplexer, and the backup-side backward direction optical add-drop multiplexer, said four optical add-drop multiplexers being connected to forward-direction and backward-direction active WDM signal lines and forward-direction and backward-direction backup WDM signal lines respectively; and a matrix switch for mutually interchanging input signals of a plurality of add signal fibers and a matrix switch capable of mutually interchanging output signals of a plurality of drop signal fibers, or an optical coupler for branching an add signal fiber into a plurality of optical fibers and an optical coupler for branching a drop signal fiber into a plurality of optical fibers, wherein the connections according to claim 9 are made.

11. Optical network equipment comprising:

at least four optical add-drop, each add-drop multiplexer having an optical switch having a function of adding at least one optical signal having a desired wavelength to a WDM signal line through which the wavelength-division multiplexed signal is transmitted, or a function of dropping at least one optical signal having a desired wavelength from the WDM signal line;

said optical switch including an add switch capable of switching the optical signal from an add state to a non-add state and vice versa, and a drop switch capable of switching the optical signal from a drop state to a non-drop state and vice versa, said add switch and said drop switch being provided on the output side, and on the input side, of the optical add-drop multiplexer respectively;

a failure detection part for detecting a failure of an optical signal that may occur on the WDM signal line, or a failure information receiving part for receiving failure information from the outside;

an optical switch control circuit for switching the states of the add switch and the states of the drop switch; and means for inputting, into the optical switch control circuit, failure occurrence information coming from the failure detection part or the failure information receiving part, and for, when the failure occurrence information is detected or received, switching either the add switch or the drop switch, or both the add switch and the drop switch, on the basis of the information, wherein the optical add-drop multiplexer can be configured so that if the optical add-drop multiplexer is connected to the active WDM signal line, at the time of normal operation, the drop switch is switched to a drop state, whereas if a failure occurs on the WDM signal line, the drop switch is switched to a non-drop state, and so that if the optical add-drop multiplexer is connected to the backup WDM signal line, at the time of normal operation, the drop switch is switched to a non-drop state, whereas if a failure occurs on the WDM signal line, the drop switch is switched to a drop state, said at least four optical add-drop multiplexers being the active-side forward direction optical add-drop multiplexer, the active-side backward direction optical add-drop multiplexer, the backup-side forward direction optical add-drop multiplexer, and the backup-side backward direction optical add-drop multiplexer, said four optical add-drop multiplexers being connected to forward-direction and backward-direction active WDM signal lines and forward-direction and backward-direction backup WDM signal lines respectively; and a matrix switch capable of mutually interchanging input signals of a plurality of add signal fibers and a matrix switch capable of mutually interchanging output signals of a plurality of drop signal fibers, or an optical coupler for branching an add signal fiber into a plurality of optical fibers and an optical coupler for branching a drop signal fiber into a plurality of optical fibers, wherein the connections according to claim 9 are made.

12. Optical network equipment comprising:

the four optical add-drop multiplexers according to claim 7, said four optical add-drop multiplexers being the active-side forward direction optical add-drop multiplexer, the active-side backward direction optical add-drop multiplexer, the backup-side forward direction optical add-drop multiplexer, and the backup-side backward direction optical add-drop multiplexer, said four optical add-drop multiplexers being connected to forward-direction and backward-direction active WDM signal lines and forward-direction and backward-direction backup WDM signal lines respectively, wherein:

a drop signal output optical fiber of the active-side forward direction optical add-drop multiplexer is connected to an add signal input optical fiber of the backup-side backward direction optical add-drop multiplexer;

a drop signal output optical fiber of the backup-side forward direction optical add-drop multiplexer is connected to an add signal input optical fiber of the active-side backward direction optical add-drop multiplexer;

a drop signal output optical fiber of the active-side backward direction optical add-drop multiplexer is connected to an add signal input optical fiber of the backup-side forward direction optical add-drop multiplexer; and a drop signal output optical fiber of the backup-side backward direction optical add-drop multiplexer is connected to an add signal input optical fiber of the active-side forward direction optical add-drop multiplexer.

13. Optical network equipment comprising:

at least four optical add-drop multiplexers, each add-drop multiplexer having an optical switch having a function of adding at least one optical signal having a desired wavelength to a WDM signal line through which the wavelength-division multiplexed signal is transmitted, or a function of dropping at least one optical signal having a desired wavelength from the WDM signal line;

said optical switch including an add switch capable of switching the optical signal from an add state to a non-add state and vice versa, and a drop switch capable of switching the optical signal from a drop state to a non-drop state and vice versa, said add switch and said drop switch being provided on the output side, and on the input side, of the optical add-drop multiplexer respectively;

a failure detection part for detecting a failure of an optical signal that may occur on the WDM signal line, or a failure information receiving part for receiving failure information from the outside;

an optical switch control circuit for switching the states of the add switch and the states of the drop switch; and means for inputting, into the optical switch control circuit, failure occurrence information coming from the failure detection part or the failure information receiving part, and for, when the failure occurrence information is detected or received, switching either the add switch or the drop switch, or both the add switch and the drop switch, on the basis of the information, wherein the optical add-drop multiplexer can be configured so that if the optical add-drop multiplexer is connected to the active WDM signal line, at the time of normal operation, the drop switch is switched to a drop state, whereas if a failure occurs on the WDM signal line, the drop switch is switched to a non-drop state, and so that if the optical add-drop multiplexer is connected to the backup WDM signal line, at the time of normal operation, the drop switch is switched to a non-drop state, whereas if a failure occurs on the WDM signal line, the drop switch is switched to a drop state, said at least four optical add-drop multiplexers being the active-side forward direction optical add-drop multiplexer, the active-side backward direction optical add-drop multiplexer, the backup-side forward direction optical add-drop multiplexer, and the backup-side backward direction optical add-drop multiplexer, said four optical add-drop multiplexers being connected to forward-direction and backward-direction active WDM signal lines and forward-direction and backward-direction backup WDM signal lines respectively; and a matrix switch capable of mutually interchanging input signals of a plurality of add signal fibers and a matrix switch capable of mutually interchanging output signals of a plurality of drop signal fibers, or an optical coupler for branching an add signal fiber into a plurality of optical fibers and an optical coupler for branching a drop signal fiber into a plurality of optical fibers, wherein the connections according to claim 12 are made.

14. Optical network equipment comprising:

at least four optical add-drop, each add-drop multiplexer having an optical switch having a function of adding at least one optical signal having a desired wavelength to a WDM signal line through which the wavelength-division multiplexed signal is transmitted, or a function of dropping at least one optical signal having a desired wavelength from the WDM signal line;

said optical switch including an add switch capable of switching the optical signal from an add state to a non-add state and vice versa, and a drop switch capable of switching the optical signal from a drop state to a non-drop state and vice versa, said add switch and said drop switch being provided on the output side, and on the input side, of the optical add-drop multiplexer respectively;

a failure detection part for detecting a failure of an optical signal that may occur on the WDM signal line, or a failure information receiving part for receiving failure information from the outside;

an optical switch control circuit for switching the states of the add switch and the states of the drop switch; and means for inputting, into the optical switch control circuit, failure occurrence information coming from the failure detection part or the failure information receiving part, and for, when the failure occurrence information is detected or received, switching either the add switch or the drop switch, or both the add switch and the drop switch, on the basis of the information, wherein the optical add-drop multiplexer can be configured so that if the optical add-drop multiplexer is connected to the active WDM signal line, at the time of normal operation, the drop switch is switched to a drop state, whereas if a failure occurs on the WDM signal line, the drop switch is switched to a non-drop state, and so that if the optical add-drop multiplexer is connected to the backup WDM signal line, at the time of normal operation, the drop switch is switched to a non-drop state, whereas if a failure occurs on the WDM signal line, the drop switch is switched to a drop state, said at least four optical add-drop multiplexers being the active-side forward direction optical add-drop multiplexer, the active-side backward direction optical add-drop multiplexer, the backup-side forward direction optical add-drop multiplexer, and the backup-side backward direction optical add-drop multiplexer, said four optical add-drop multiplexers being connected to forward-direction and backward-direction active WDM signal lines and forward-direction and backward-direction backup WDM signal lines respectively; and a matrix switch capable of mutually interchanging input signals of a plurality of add signal fibers and a matrix switch capable of mutually interchanging output signals of a plurality of drop signal fibers, or an optical coupler for branching an add signal fiber into a plurality of optical fibers and an optical coupler for branching a drop signal fiber into a plurality of optical fibers, wherein the connections according to claim 12 are made.

15. Optical network equipment comprising:

active-side and backup-side optical add-drop multiplexers according to claim 7 corresponding to first and second networks, said active-side and backup-side optical add-drop multiplexers being able to be connected to the first and second optical networks, each of which includes active and backup WDM signals line, wherein:

a drop signal output optical fiber of the active-side optical add-drop multiplexer of the first optical network and a drop signal output optical fiber of the backup-side optical add-drop multiplexer of the first optical network are connected to two input fibers of a first 2:2 optical coupler respectively, and two output fibers of the first 2:2 optical coupler are connected to an add signal input optical fiber of the active-side optical add-drop multiplexer of the second optical network and an add signal input optical fiber of the backup-side optical add-drop multiplexer of the second optical network respectively; and a drop signal output optical fiber of the active-side optical add-drop multiplexer of the second optical network and a drop signal output optical fiber of the backup-side optical add-drop multiplexer of the second optical network are connected to two input fibers of a second 2:2 optical coupler respectively, and two output fibers of the second 2:2 optical coupler are connected to an add signal input optical fiber of the active-side optical add-drop multiplexer of the first optical network and an add signal input optical fiber of the backup-side optical add-drop multiplexer of the first optical network respectively.

16. An optical network in which the active-side and backup-side optical add-drop multiplexers according to claim 7 are located in active and backup WDM signal lines respectively, wherein:

optical network equipment is located at input and output points of an optical signal from and to WDM signal lines, said optical network equipment can be configured so that at the time of normal operation, the optical signal is transmitted from an input point on the farthest upstream side to an output point on farthest downstream side by use of an active-side optical path, and so that if the failure occurs, a state of an add switch or that of a drop switch is switched in the active-side and backup-side optical add-drop multiplexers both on the adjacent upstream side and on the adjacent downstream side of the point of failure to make a detour around a faulty span of the active signal line so that the optical signal is transmitted to the backup-side optical path.

17. An optical add-drop multiplexer according to claim 7, wherein:

a switch for blocking a through signal is located in each optical signal path corresponding to each wavelength.

18. Optical network equipment comprising:

active-side and backup-side optical add-drop multiplexers, which are connected to active and backup WDM signal lines respectively, each of the active-side and backup-side optical add-drop multiplexers having a function of demultiplexing an inputted wavelength-division multiplexed signal on a wavelength length basis, and adding or dropping part or all of the demultiplexed optical signals on a wavelength basis, and then multiplexing these optical signals again before outputting the multiplexed signal, said optical add-drop multiplexer comprising:

an optical switch having a function of adding at least one optical signal having a desired wavelength to a WDM signal line through which the wavelength-division multiplexed signal is transmitted, or a function of dropping at least one optical signal having a desired wavelength from the WDM signal line;

said optical switch including an add switch capable of switching the optical signal from an add state to a non-add state and vice versa, and a drop switch capable of switching the optical signal from a drop state to a non-drop state and vice versa, said add switch and said drop switch being provided on the output side, and on the input side, of the optical add-drop multiplexer respectively;

a failure detection part for detecting a failure of an optical signal that may occur on the WDM signal line, or a failure information receiving part for receiving failure information from the outside;

an optical switch control circuit for switching the states of the add switch and the states of the drop switch; and means for inputting, into the optical switch control circuit, failure occurrence information coming from the failure detection part or the failure information receiving part, and for, when the failure occurrence information is detected or received, switching either the add switch or the drop switch, or both the add switch and the drop switch, on the basis of the information, wherein:

if an inputted optical signal is added to the WDM signal line from the outside, the inputted optical signal is branched into two through a 1:2 optical coupler, and the branched optical signals are then connected to an add signal input optical fiber of the active-side optical add-drop multiplexer and an add signal input optical fiber of the backup-side optical add-drop multiplexer respectively; and if the optical signal is dropped from the WDM signal line, a drop signal output optical fiber of the active-side optical add-drop multiplexer and a drop signal output optical fiber of the backup-side optical add-drop multiplexer are connected to two input fibers of a 2:1 optical coupler respectively so that one of output light of both drop signal output optical fibers is output from an output fiber of the optical coupler.

19. Optical network equipment according to claim 18, further comprising:

a two-output optical transmitter including an optical transmitter for outputting an optical signal having the wavelength, the 1:2 optical coupler for branching the output optical signal of the optical transmitter into two to output the two optical signals, and two output parts, said two-output optical transmitter being able to be connected to an add signal input part of the optical network equipment; or a two-input optical receiver including two input parts for inputting two optical signals corresponding to the wavelength, and the 2:1 optical coupler for coupling the two input optical signals, said two-input optical receiver receiving the coupled optical signal, said two-input optical receiver being able to be connected to a drop signal output part of the optical network equipment; or a two-output two-input optical transceiver including both of the two-output optical transmitter and the two-input optical receiver.

20. An optical network in which the active-side and backup-side optical add-drop multiplexers according to claim 4 are located in active and backup WDM signal lines respectively, wherein:

optical network equipment is located at input and output points of an optical signal from and to WDM signal lines, said optical network equipment can be configured so that at the time of normal operation, the optical signal is transmitted from an input point on the farthest upstream side to an output point on the farthest downstream side by use of an active-side optical path, and so that if the failure occurs, add switches of the active-side and backup-side optical add-drop multiplexers located on the farthest upstream side are switched to transmit the optical signal to a backup-side optical path.

21. Optical network equipment according to claim 18, wherein:

a switch for blocking a through signal is located in each optical signal path corresponding to each wavelength.

* * * * *

UNITED STATES PATENT AND TRADEMARK OFFICE
CERTIFICATE OF CORRECTION

PATENT NO.        : 7,650,075 B2
APPLICATION NO. : 11/200036
DATED             : January 19, 2010
INVENTOR(S)       : Nobuhiko Kikuchi It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 988 days.

Signed and Sealed this

Twenty-third Day of November, 2010

David J. Kappos
*Director of the United States Patent and Trademark Office*